United States Patent Office 3,488,256
Patented Jan. 6, 1970

3,488,256
ALTERATION OF ACTIVITY OF NATURAL PRODUCT MOLECULES
Robert L. High, Canal Winchester, and Saul Rogols, Circleville, Pickaway, Ohio, assignors to The Keever Company, a corporation of Ohio
Continuation-in-part of applications Ser. No. 514,201, Dec. 16, 1965, and Ser. No. 486,923, Sept. 13, 1965. This application Apr. 14, 1966, Ser. No. 542,502
Int. Cl. C12b 1/00
U.S. Cl. 195—7                                      31 Claims

ABSTRACT OF THE DISCLOSURE

Atypical fragments of a natural product molecule are altered by enzymic reaction. For example, a carbohydrate molecule such as starch is reacted with a proteinase to alter atypical protein fragments or with a lipase to alter atypical lipid fragments. Similarly, a protein molecule such as an enzyme is reacted with lipase. The alteration effects a unique activation of the natural product molecule.

---

This application is a continuation in part of applications Ser. No. 514,201, filed Dec. 16, 1965, and Ser. No. 486,923, filed Sept. 13, 1965; the latter being a continuation in part of Ser. No. 318,415, filed Oct. 23, 1963 (now abandoned); Ser. No. 348,553, filed Mar. 2, 1964 (now abandoned), and Ser. No. 362,774, filed Apr. 27, 1964 (now abandoned).

Our invention deals with uniquely activated molecules derived from natural product molecules which contain, following substantial purification, intrinsic atypical molecular fragments. The invention also deals, in its broadest aspect, with methods of altering the configuration and the state of activation of such molecules. More specifically, the invention deals with the alteration of the activity of a natural product molecule (1) by the selective degradation of an intrinsic atypical molecular fragment of said molecule; (2) by the selective synthesis of such an intrinsically-bound atypical molecular fragment, or (3) by the replacement of one such fragment with another. The term "natural product" is emphasized because the methods of the invention do not apply to products made synthetically for reasons which will be discussed hereinafter. Similarly, it is emphasized that the degraded (or synthesized) part of the molecule is "atypical," "intrinsic," and "selectively" altered.

Our invention is also concerned with the preparation of uniquely activated forms of starch, with control of the state of activation of starch, and, more particularly, with methods of changing the state of activation of starch. In addition, this invention includes a process of pretreating, or altering, a partial hydrolysate of starch before subjecting it to further hydrolysis. In one specific embodiment, this invention deals with the production of dextrose from the above pretreated or altered starch hydrolysate.

In connection with the nature of the "selective" alteration of atypical molecular fragments, the invention deals, for example, with methods of selectively utilizing as energy of activation some of the free energy made available by the selective acceleration of the degradation, or bond rupture, of such atypical molecular fragments. Referring to specific types of natural products, the invention deals with methods of altering the nature of the reactivity of enzymes, starch and starch hydrolysates, dextrins, sugars, proteins, lipids, nucleic acid-containing substances, cellulose, chitin, dextran, hormones, gums, mucopolysaccharides, glycogen, and like substances of natural origin by a selective enzymic reaction involving atypical materials inherently associated with the molecules of said substances.

The invention has already proven to have great economic value, and some of its many practical uses, now known to us, will be pointed out hereinafter. However, we think the invention will ultimately prove to have much greater value since the method of the invention can be used as a "tool" for biochemists in the investigation of both the theoretical and economically significant properties of molecules of naturally occurring substances to establish how, and to what extent, the physical structure, or steric configuration, of such molecules can be "tailored" to fit specific needs.

Because the term "activation" has been frequently used elsewhere in something other than its correct chemical meaning; because the term has been frequently defined in a somewhat correct but oversimplified manner; and because an understanding of the meaning of activation is necessary to an understanding of our invention, it appears important that a definition of this term and some discussion of its application be given prior to a description of the invention itself.

One's purpose in activating a molecule is to allow it to undergo a chemical reaction when, without activation, it would not so react. Simplified definitions of activation usually give meaning to the term by pointing out that a molecule can be activated by increasing its internal energy. Thus the definition given in the Condensed Chemical Dictionary, fifth edition (Reinhold Publishing Corporation, New York, 1956) is as follows:

Activation: a process which increases the internal energy of molecules and so allows them to undergo chemical reaction when otherwise they would not do so.

However, the essence of activation is not so much that the "internal energy" of the molecule has been increased but rather that an increase in energy has been made available at a specific site. Therefore a more meaningful form of the above definition is: Activation.—a process wherein the internal energy of a molecule, or a reacting portion thereof, is increased, redistributed, or otherwise altered to allow the molecule to undergo chemical reaction when otherwise it would not do so.

The present invention presents, in some of its applications, a seeming paradox in that a molecule may be activated in a process in which there is a decrease in the internal energy of the molecule. The paradox is resolved, however, when it is noted (1) that our process can effect an increase in energy in the "reacting portion" of a molecule at the expense of a mathematically greater decrease in the energy of another portion of the molecule, thus effecting an overall decrease in the internal energy of the molecule; and (2) that, in our process, there is a change in, or rearrangement of, the material portion of the molecule (a change in configuration), and it is this latter material change which effects the energy change. In connection with this latter point we could (with justification but with a loss of clarity) omit reference to activation and describe our invention as involving the preparation of new molecules. We believe, however, that those skilled in the art will recognize that our "selective alteration" of molecules represents a phenomenon embracing both these concepts since, in every reaction of interest, there is both a unique material change and a unique energy change in the treated molecule. We have elected to dwell on the latter at this point in the description because the ultimate utility of the altered molecule is manifested in its change in activity. Later on in the description, however, when we offer specific teachings on the operation of our methods, we will dwell on the unique nature of the material changes. Some of the significant aspects of activation may now be considered.

The individual molecules in a reacting system have quite a wide variation in energy content. For any specific reaction it is frequently the case that only a minor percentage of the molecules posses sufficient energy to react. As these active molecules react, other molecules (by absorption of energy from their surroundings, for example) attain the energy level necessary for reaction. Frequently, therefore, activation involves imparting to the reaction system some additional energy over and above its intrinsic energy content, the additional energy required for reaction being referred to as the energy of activation. Such activation energy is required for reaction even though the reaction is a spontaneous one; that is, a reaction which itself possesses the capacity to do work. Heat is a common source of activation energy and most chemical reactions proceed at higher velocities when carried out at higher temperatures. Similarly, light can activate or "excite" molecules.

A molecule may change its status from inactive to active in ways other than by the direct absorption of energy via heat or light. A catalyst, by providing, for example, an adsorptive surface for reacting molecules can, in effect, reduce the required energy of activation and thus bring a higher fraction of the molecules present within the activated category.

Large molecules often illustrate other types of activation as, for example, in reactions involving cross-linking between molecules of the same species and in reactions involving the rupture of bonds within the molecule. In reactions involving large molecules, the activity of the molecules frequently reflects the nature of the reactive sites on the molecules; that is, whether they are occupied by another atom, whether the site is blocked by a neighboring substituent, the location of hydrogen bonds, etc. To change the state of activation in this latter case may require the alteration of or the removal of a constituent at the reactive site, may require the alteration of or the removal of a constituent at a neighboring site, or may require other steric changes in the molecule which make the reactive site more or less available for a specific reaction.

It is, of course, possible that one may wish to deactivate a molecule; that is, make it less reactive in certain of its reactions. Thus, in referring to the present invention, we use the expression "unique activation" or "uniquely activated" in the sense that such activation, although usually increased over the state of activation of the previously untreated molecule, may, if desired, be a lower state of activation. Further, such unique activation may be a higher state of activation for one reaction and a lower state of activation for another reaction.

In any discussion of the activation of molecules of natural products and particularly of large molecules such as starch molecules or enzyme molecules, some question may arise as to where the molecule ends and where some other moiety begins. By way of example, textbook definitions most frequently limit the starch "molecule" to the carbohydrate moiety. Actually the starch molecule contains other moieties and practically the chemical behavior of commercial starch in influenced by all intrinsic constituents, carbohydrate or otherwise, which are bound directly or indirectly to the molecule. Thus, for our purposes here, the starch "molecule" includes all atoms or moieties which are bound directly or indirectly, to the carbohydrate moiety in a manner to influence the state of activation of the starch. Thus, the starch molecules of commercial starch, as will be discussed more fully hereinafter, include normally present, intrinsic noncarbohydrate constituents.

Further and by way of example, text book definitions emphasize that an enzyme molecule consists essentially of a protein moiety. Here again, however, we have found that enzyme molecules may contain other moieties and the chemical behavior of an enzyme may be influenced by any such intrinsic constituent of the enzyme molecule, be it a carbohydrate, lipid, or other constituent, which is bound directly or indirectly to the protein moiety of the molecule. Thus for our purposes here, the enzyme "molecule" includes all atoms or moieties which are bound directly or indirectly to the protein in a manner to influence the state of activation of the enzyme.

It is, of course, well known that enzymes can be activated in various ways (in some cases by the addition of metal ions, in some cases by the addition of sulfhydryl compounds, and in some cases by conversion to an active form as by kinase catalysis). Such activation does not require that the added substance combine with the "active center" of the enzymes. Rather, it is recognized that the "activator" may combine with the molecule at a site different from the site at which the substrate is bound but that such alteration leads to a change in the catalytic nature of the active center. Enzymes can be deactivated by various denaturation processes. It will be seen hereinafter that our method of activation of an enzyme involves a selective alteration of the enzyme molecule in the absence of conventional known enzyme activators.

Further, and to use now a relatively small molecule by way of example, a sucrose molecule (as derived from cane sugar, for example) is usually considered as the carbohydrate moiety, $C_{12}H_{22}O_{11}$. As will appear hereinafter, the activity of the sucrose molecule derived from a natural source is influenced by the presence, in the molecule, of intrinsic constituents other than carbohydrate moieties. Thus, for our purposes, the sucrose "molecule" includes all atoms or moieties which are bound directly or indirectly to the carbohydrate moiety in a manner to influence the state of activation of the sucrose.

As illustrated in the case of starch, enzyme, and sucrose molecules, the invention deals with molecules of natural origin wherein the molecule includes a principal, or typical constituent which may constitute, for example, 99 percent of the molecule; but wherein the molecule also includes, as a molecular fragment, a diverse, or atypical, constituent which might constitute a few hundredths or a few tenths of one percent of the molecule. For example, in a starch molecule the carbohydrate moiety is typical and anucleic acid, if chemically bound thereto, a atypical; in an enzyme molecule the protein moiety is typical and a lipid moiety, if chemically bound thereto, is atypical; and in a sugar molecule a hexose moiety is typical and a protein moiety, if chemically attached thereto, is atypical.

In molecules of natural products, one will most often identify or designate the typical constituent and an atypical constituent solely on the basis of the relative proportions of the two present for the reason that it is most often the major constituent which is involved in the chemical reaction or usage of interest. We have found, however, examples where the designation may be otherwise depending on the intent of the worker. By way of example, we have found that certain polysaccharide molecules include, as intrinsic constituents, a lipid fragment and a latent enzyme (which can serve as a synthesizing or hydrolyzing agent, when activated). An analysis of such a polysaccharide would show a large proportion of carbohydrate, a small proportion of lipid, and also a small proportion of enzyme. In this case, we have at least two elections. On the one hand, we can treat the polysaccharide as typical and, for purposes of activation of the polysaccharide, alter the lipid or enzyme constituents. On the other hand, we can treat the enzyme moiety as typical; treat the lipid as atypical; and (as will be discussed more fully hereinafter) effect the unique activation of one enzyme (protein typical) by means of a second enzyme; for example, a lipase (acting on atypical lipid); in the presence of the carbohydrate moiety which may or may not be activated. As will be seen hereinafter, the selective activation of a latent hydrolase (which is at the time intrinsically associated with a polysaccharide molecule) by the selective alteration of an atypical constituent (also intrinsically associated with the hydrolase) produces a very startling and very valuable result.

The method of the invention, when it results in the removal of atypical molecular fragments from a molecule, does not involve purification per se and, when it results in the adding to or synthesis of atypical molecular fragments, does not involve purification in any sense of the word. Therefore, we hesitate to refer to the atypical materials of interest as impurities for the reason that the term "impurity" usually refers to an undesirable ingredient. To the contrary here, and for the purpose of securing the advantages of this invention, the presence of these intrinsic atypical molecular fragments in an otherwise typical molecule is not undesirable, but rather is absolutely essential. Their absense, as in comparable laboratory-synthesized molecules, makes the attainment of the objectives of the invention impossible. Thus, some atypical intrinsic constituent is always involved in the method of the invention and such constituent must be present at the start (to be altered) and is frequently still present at the end (following synthesis, replacement, or partial alteration).

Further, we hesitate to refer to the atypical molecular fragments as impurities for the reason that the mere (and sole) physical presence of these atypical materials as impurities is not sufficient to create an environment in which the method can operate and may even inhibit or present an insurmountable barrier to the use of the method. If, for example, the atypical materials were present solely as "physically associated" impurities, the attainment of the objective of the invention would be impossible. Similarly, if the materials are present both as intrinsic molecular constituents and as more than a minor percentage of physically associated impurities, the latter may prevent or restrict the selective involvement of the former.

The foregoing can be better understood by a more detailed description using the starch molecule, by way of example, as the typical moiety. We have investigated thoroughly the action of all types of enzymes on the several atypical moieties contained in starch molecules of all kinds and especially the degradation of such moieties by enzymic attack. For our discussion, we will use protein as an example of an atypical intrinsic constituent of starch. For this purpose it is necessary to distinguish among at least three classes of protein.

The first class of such material to be considered, and to be distinguished from, may be referred to as "washable protein" and consists essentially of gluten and soluble protein. Wheat gluten, corn gluten, etc. are examples of washable protein. Substantially all the gluten of wheat flour, corn meal, or other source of starch is washed out during the processing to make starch, but commercial starches do contain residual gluten. By way of example, a commercial corn starch (having had a substantial percentage of corn gluten washed out) may still contain, for example, about 0.45–0.50% total protein. Of this latter protein about 0.2% may be difficulty washable protein. This latter small percentage of difficulty washable protein, although requiring relatively more elaborate washing procedures for its removal, is classified here as "washable" and not as an intrinsic constituent for the reasons (1) that its removal can be effected by washing; (2) that its alteration, removal, or increase in concentration does not appear to alter the state of activation of the starch; and, in particular, (3) that its alteration, removal, or increase in concentration does not contribute to the rather dramatic changes in properties observed following the removal of (or addition of) the other two classes of protein to be discussed.

We have found that when it is desirable to remove the small residue of washable protein present in commercial starches it can be removed, for example, by the following method. A slurry of starch is acidified; for example, to a pH of about 2.5; and the slurry is heated to about 40–60° C. These conditions are maintained for a number of hours, for example 12 hours, and the starch is then filtered out and washed with water. We have found that the total protein of a commercial corn starch, containing about 0.4–0.5% protein and treated in this manner, drops about 30–45% to a level of about 0.28–0.30%. This method does not, however, remove a significant proportion, if any, of the two classes of non-washable protein to be discussed hereinafter.

Prucha and Widmer in U.S. Patent No. 1,582,537 issued Apr. 27, 1926, teach that washable protein may be removed from commercial corn starch containing about 0.5% total protein by treating an acidified and heated corn starch slurry with a small proportion of pepsin (about 0.002% of a commercial pepsin of 1 to 3000 strength based on the solubilizing of egg albumen—a strength equal to about 0.0004% based on presently available purified pepsin). We find that, following the teachings of Prucha and Widmer, we can remove about 0.15% washable protein from a commercial corn starch containing 0.44% total protein. Similarly, this method does not remove a significant proportion, if any, of the two classes of non-washable protein to be discussed hereinafter. As will be shown hereinafter, it requires a minimum of about 0.008% of a relatively pure pepsin (about 1 to 15,000 strength); or about 20 times the concentration of pepsin used by Prucha and Widmer in removing washable protein; to remove any significant proportion of molecular fragments of intrinsic protein or to achieve any significant change in the activation of the starch molecule.

In any event; whether the washable protein is removed by the method of Prucha and Widmer, by the alternative method previously outlined or by some other method; the resulting usually thoroughly washed commercial starch contains additional and non-washable protein and may contain, for example, about 0.3% of such non-washable protein. It is important, further, that such non-washable protein not only be distinguished from washable protein but that it be recognized that the non-washable protein comprises at least two classes of protein of primary interest in our invention which for activation purposes must be treated differently and therefore must be distinguished from each other.

Thus, a second class of protein to be considered is not washable but, on the contrary, is an intrinsic atypical constituent of the starch, appearing to be united chemically to the starch molecule. These proteins appear to contain metal atoms since the selective removal of molecular fragments of these proteins is accompanied by a reduction in the proportion of metal atoms present. The properties of this second class of proteins are such as to indicate that they comprise residual synthetases: that is, enzymes which took part in the synthesis of, or reactions of, the starch in the living plant and which remained molecularly bound to the starch. Other properties indicate that this "second class" of proteins also comprises latent starch hydrolases.

We have previously referred to the proteins of this second class as "starch protein" or "starch-complexed protein" but to distinguish them even more clearly from washable proteins (physically associated impurities) present in commercial starch we will refer herein to this second class of proteins intrinsically present in commercial starch as "non-washable starch-complexed protein" and as "intrinsic protein."

As indicated above, the selective degradation and removal of intrinsic protein (non-washable starch-complexed protein) from commercial starch yields a starch with a number of improved qualities; for example, a starch which when used in papermaking results in paper of improved strength.

The third class of protein materials to be considered (being the second class of non-washable protein considered) is that which includes in its structure nucleic acids such as desoxy-ribonucleic acid (DNA) and ribonucleic acid (RNA). Nucleic acids are characterized by the presence of phosphate and members of the five nitrogen bases: adenine, guanine, thymine, cytosine, and uracil. This latter class of proteins, comprising those associated with nucleic acids, are generally referred to as "nucleoproteins" or "genetic" proteins.

Thus, our invention when applied to starch and starch hydrolysates, with carbohydrate as the typical constituent and protein, for example, as the atypical intrinsic constituent; does not deal with the removal of such substances as washable proteins, although their removal may also be advantageous as pointed out in the art. Our invention when applied to carbohydrates (starch, cellulose, sugars, chitin, glycogen, dextran, gums, mucopolysaccharides, etc.) deals usually with the alteration of, molecular fragmentation of, or additional synthesis of one or more of the group of constituents consisting of (1) intrinsic lipid, (2) intrinsic enzyme and other protein, (3) intrinsic constituents containing inorganic moieties, and (4) intrinsic nucleoprotein. Further, our invention deals with the alteration of, molecular fragmentation of, or synthesis of these constituents in a selective manner to yield uniquely activated starches. It will be apparent to those skilled in the art that the removal of nucleic acid-protein complexes will effect simultaneously the removal of phosphates. Similarly, other inorganic moieties will be affected. Similarly, our invention when applied to the alteration of enzymes, hormones and other proteins, for example, deals primarily with the alteration, or molecular fragmentation, of lipid and other atypical, intrinsic molecular constituents.

OBJECTS

It is an object of this invention to provide uniquely activated molecules of natural products and methods for their preparation.

It is a further object to provide methods for the alteration of the state of activation of the molecules of natural products such as starch and starch hydrolysates, proteins, dextrins, enzymes, fats, sugars, chitin, dextran, hormones, gums, and the like; which molecules include intrinsic, atypical, spontaneously degradable constituents.

It is an object of the invention to activate latent enzymes intrinsically associated with the molecules of a natural product.

It is a further object to alter the state of activation of molecules of a natural product by the selective enzymic alteration of, or selective enzymic degradation of, or selective enzymic synthesis of an intrinsic atypical fragment of the molecules.

It is a further primary object of our invention to provide methods for altering the configuration of molecules of a natural product by the enzymic degradation of atypical intrinsic degradable constituents of such molecules.

It is also a specific object to alter the state of activation of an enzyme by the selective alteration of an intrinsic atypical (that is, non-protein) constituent of the enzyme molecule.

It is a further specific object to alter the optical rotation of a molecule, such as sucrose, by selective alteration of an atypical molecular fragment of said molecule.

It is a further specific object to treat molecules of natural products in a selective manner to alter the activity of said molecules and then use such molecules in a chemical reaction in which said activity determines the extent or character of the reaction.

Another object of our invention is the production of a starch in which there has been selective alteration of molecular fragments of any one, any two, any three, or all four of the following classes of materials intrinsic to commercial starch- (1) lipid; (2) non-washable starch-complexed protein; (3) metal and other intrinsic inorganic moieties; and (4) nucleic acid, including nucleoprotein.

Another object of our invention is the preparation of a starch product which is valuable in the manufacture of paper.

Still another object of this invention is to provide processes for treating starch hydrolysates in order to make them relatively more active in subsequent hydrolytic actions.

Yet another object of this invention is to provide a uniquely altered starch hydrolysate which, as compared to the control unaltered hydrolysate, can undergo hydrolysis at a faster rate, to a greater degree of completion, and in a shorter time and with a lower concentration of the hydrolytic enzyme.

Other objects and features of our invention will become apparent as the description proceeds.

We have now found that the foregoing and related objects can be obtained in a method of selectively altering the activity of molecules of a substantially pure natural product which molecules include, as intrinsic constituents thereof, atypical molecular fragments containing spontaneously degradable bonds; said method comprising the step of effecting an enzymic reaction of said molecules with an effective proportion of a suitable atypical enzyme to alter the configuration of said molecules. The enzymic reaction may alter the configuration of the molecules by accelerating the degradation of the bonds, by adding additional atypical fragments, or by removing some atypical fragments and replacing them with other such fragments.

The term "atypical" enzyme, as used herein, refers to an enzyme having specific activity toward an intrinsic atypical constituent, or fragment, of a molecule.

Examples of natural products contemplated by the invention are: starch, dextrins (starch hydrolysates), sugars, lipids, proteins, enzymes, dextran, chitin, hormones, gums, cellulose, mucopolysaccharides, and the like. Examples of a typical molecular fragments which can occur as intrinsic constituents of such natural product molecules are: protein, lipid, nucleic acids, and nucleoprotein, which fragments include, for example, metal atoms and other inorganic moieties. Examples of suitable enzymes are hydrolases and synthesases generally, lipases and other esterases, proteinases, exonucleases, and the like.

The invention is further illustrated in the accompanying drawings wherein.

More detailed references will be made to the drawings as the description proceeds.

DETAILED DESCRIPTION

Figure 1:
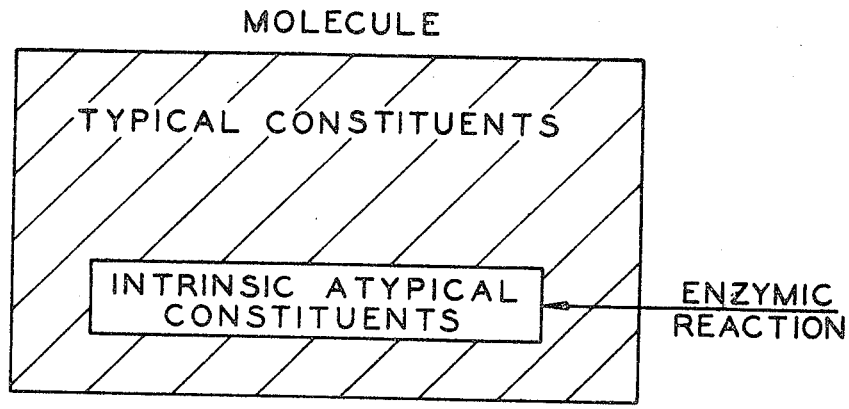
FIGURE 1 is a diagram illustrating our invention in a relatively broad aspect.

We now illustrate the general principles of the invention by using commercial starch as an example of a substantially purified natural product, the molecules of which may include enzymes or other protein, lipid, and nucleic acids as intrinsic atypical molecular fragments. Such a molecule is illustrated by the diagram of FIG. 1 wherein the rectangle symbolizes a molecule which comprises typical constituents and atypical constituents. As indicated, the method of the invention involves selected enzymic reaction involving an atypical constituents. We now consider in detail the selective alteration of the intrinsic protein constituent of the starch molecule by enzymic reaction of the molecule with a proteinase.

Commercial starch is made into a slurry and is mixed with an effective concentration of proteinase, or proteolytic enzyme. The proteinase is generally permitted to react with the starch at a temperature of about 20°–60° C. for about two hours or more and at a pH of about 3–8 depending on the particular proteinase used. When the reaction has proceeded to the extent desired, it is usually stopped by deactivating the proteinase; for example, by a pH change, by a temperature change, or by the addition of certain heavy metals. Thereafter, and if sufficient time has elapsed, the atypical intrinsic protein will show evidence of degradation and the amino acid and pepitide residues, together with metal-containing washable residues, can be washed from the starch. The resulting uniquely activated starch may be used directly without drying in paper making, for example, or may be dried and stored for subsequent use.

The foregoing reaction conditions can result in the partial or in the substantially complete removal of protein and associated metal atoms. Specifically desired activated products may be secured by controlling the duration of the reaction or the percentage of protein removed. Both these control devices are necessary since we have obtained improved products in time periods of reaction so short that a change in protein analysis could not be detected.

We have found that the proteinase may be a plant proteinase such as bromelain, ficin, papain or the like; or it may be an animal proteinase such as pepsin, trypsin, chymotrypsin or the like. The starch may be any kind of starch such as, for example, wheat, corn, waxy maize, potato, rice, tapioca, arrow-root, sago, tapioca sago, yucca, barley, waxy sorghum, sweet potato, and the like. Each of these starches has a particular proteinase which is most effective to remove the intrinsic protein therefrom. For each starch and for each proteinase, a particular ratio of enzyme to starch and a particular pH value is most effective. This latter ratio and latter pH may be readily determined by a few preliminary test reaction mixtures.

The methods of the invention can also be illustrated by an enzymic reaction on another atypical intrinsic constituent of starch, the lipid fragment of the starch molecule. For this reaction, we prepare a suitable water solution of a suitable lipase and adjust this to a suitable pH. We also procure or prepare a slurry of starch as a dispersion in water and adjust the pH thereof to agree substantially with that of the enzyme solution. We add a suitable quantity of the lipase enzyme solution to the slurry and allow this to stand for a desired time and then stop the induced reaction by an appropriate means such as, for example, by the addition of acid or the application of heat. We then separate, if the reaction time is long enough, a substantially lipid-free starch. Again, and as explained above, a shorter reaction time may be used to yield a specifically desired degree of activation.

The uniquely activated form of selectively lipid-altered commercial starch can be demonstrated by a hydrolysis of the resulting starch. Thus we can form a slurry of the lipase treated starch in water and subject it to hydrolyzing conditions. The hydrolysis may be catalysed by acid, by a suitable dextrongenic enzyme, or by a combination of suitable enzymes.

Hydrolysis of the activated, lipid-altered starch with a mild acid is much more efficient in giving thin boiling starches than the usual prior processes. Hydrolysis proceeds faster and to a greater extent with the activated starch product than with the precursor commercial starch from which it is formed. Such lipase treated starches, of which lipase treated corn starch is a particular example, may be advantageously enzymatically hydrolyzed or acid hydrolyzed to yield a mixture of dextrose and liquid sugar syrup, the dextrose being dissolved in the syrup. The activated, lipid-altered starches may also be treated with both acid and enzymes for the efficient production of dextrose and syrup. Crystalline dextrose may be efficiently obtained, if desired, instead of the solution thereof in syrup. Enzymic hydrolysis may be an amylase, by an amyloglucosidase, or by a combination of such dextrogenic enzymes. The use of our activated starch product in hydrolysis permits a choice of advantages—a shorter period of reaction, use of less dextrogenic enzyme, or greater production. For example; at normal operating temperatures, for the same amount of time as that usually required, and using the same proportion of dextrose producing enzymes; we can increase the yield of dextrose enormously. Alternatively, at the same temperature and in the same time we can produce the same amount of dextrose with a reduction in the amount of dextrose producing enzymes over the amount usually required. Alternatively, using the same relative amount of enzymes and at the usual temperature, we can produce the same amount of dextrose in a very much shorter time.

The use of a lipase to degrade lipid fragments intrinsic to the starch molecule provides an example of increasing activation for one purpose being accompanied by decreasing activation for another purpose. Thus we have found that activation of the starch by lipase treatment alone in a manner to increase the rate of, and the extent of, hydrolysis thereof is accompanied by a deactivation of the starch for those reactions involving cross linkage of molecules such as occurs in film formation.

A rather dramatic example of the flexibility of our methods of controlling the degree of activation of starch is evidenced by comparing the hydrolysis of commercial starch, the hydrolysis of a lipase treated starch, and the hydrolysis of a proteinase treated starch. As already pointed out, alteration of a starch molecule with a lipase can increase its susceptibility to hydrolysis. However, alteration of a starch molecule with a proteinase gives the direct opposite effect—it decreases the susceptibility of the starch molecule to hydrolysis. This result indicates that increasing the degree of a specifically desired type of activation is not merely a question of more extensive purification and also suggests that there may be reactive sites on the non-carbohydrate moieties as well as on the carbohydrate moiety. Similarly, the purification of starch by the removal of lipid by solvent extraction, although frequently advantageous, does not produce the result achieved by the selective enzymic degradation of the lipid.

We have found that the lipase degradation of intrinsic lipid is usable with great advantage on various kinds of starch, as for example, on wheat starch, corn starch, tapioca starch, waxy maize starch, or potato starch.

Similarly, we have found that various kinds of lipases are usable. We can use lipases derived from wheat germ; from pancreas; from intestinal tracts of various animals; or, for example, we can use lecithinases. Also, we can use combinations of these lipases mixed by us or we can use commercially prepared combinations such as steapsin. Each starch apparently has a particular lipase which is most effective to remove the lipid therefrom. For each starch and for each enzyme there is a particular ratio of enzyme to starch and a particular pH which is most effective for the reaction mixture. This latter ratio and latter pH may be determined by a few preliminary test reaction mixtures.

The methods of the invention can also be illustrated by the enzymic reaction on yet another atypical intrinsic constituent of the starch molecule—the nucleic acid-containing molecular fragments. Thus, we make a slurry of commercial starch and treat it with an exonuclease. The exonuclease is permitted to react with the starch at a temperature of about 28° C. and at a pH of about 8.8 for several days. When the reaction has proceeded to the extent desired, it is usually stopped by inactivating the exonuclease, for example, by a temperature change or a pH change. Our preferred exonuclease is a phosphodiesterase, particularly the phosphodiesterase lyophilized from Crotalus adamantius venom. However, other exonuclease may be used. The starch may be wheat, corn, waxy maize, tapioca, and the like, but the activated starch product formed by the reaction of an exonuclease on potato starch (or starch of other tubers) is uniquely subject to change by our methods.

The enzymic reactions (with a proteinase, lipase, or exonuclease) described in connection with the alteration of atypical intrinsic constituents of starch may be carried out singly, with any two simultaneously, with all three simultaneously, with any two sequentially, or with all three sequentially and in any order. Some adjustment of the concentration of the enzymes may be required when the enzymes are used simultaneously. For example, lipases may inhibit the action of proteinases and their simultaneous use usually requires that the lipase concentration be at a minimum while the proteinase concentration is adjusted upwardly.

In the use of the foregoing enzymes on starch, one may meet with the seeming anomaly of an enzyme, for example a proteinase, effecting the removal of a constituent toward which it does not have specific action. By way of example, one may observe a proteinase effecting the removal of nucleoprotein. Although we do not wish to be limited by theoretical considerations, it is our theory that this phenomenon occurs in the manner illustrated in FIG. 4 in the accompanying drawings to which reference is now made.

It appears that the three members of the class of atypical intrinsic non-carbohydrate constituents of primary interest in the alteration of a starch molecule—lipids, protein, and nuclei acid (including nucleoprotein usually associated therewith)—share a common property in that not one hundred percent of any one member is attached directly to starch molecules in all starches. Rather, it appears that each member may, to some extent, be attached to the starch molecule via a structural residue of another of the members. Thus, in FIG. 4 there is illustrated a distal nucleoprotein, wherein peptide residues are linked together with the amine bases of nucleic acids. The nucleoprotein is illustrated as being molecularly bound to starch A via the proximal protein moiety of a non-washable starch-complexed protein, wherein linkages are essentially amide bonds. In such case a proteinase, by catalyzing the hydrolysis of amide bonds of the proximal protein moiety, would effect the removal of the distal nucleic acid and nucleoprotein from the starch just as effectively as an exonuclease. Such degradation would, however, manifest itself by the appearance in the solution of free peptide residues and the absence of free nitrogen bases. On the contrary, the action of an exonuclease on the same starch A, as indicated, would degrade the nucleic acid moiety and release nitrogen bases but would leave the proximal protein-starch complex virtually intact.

Figure 4:
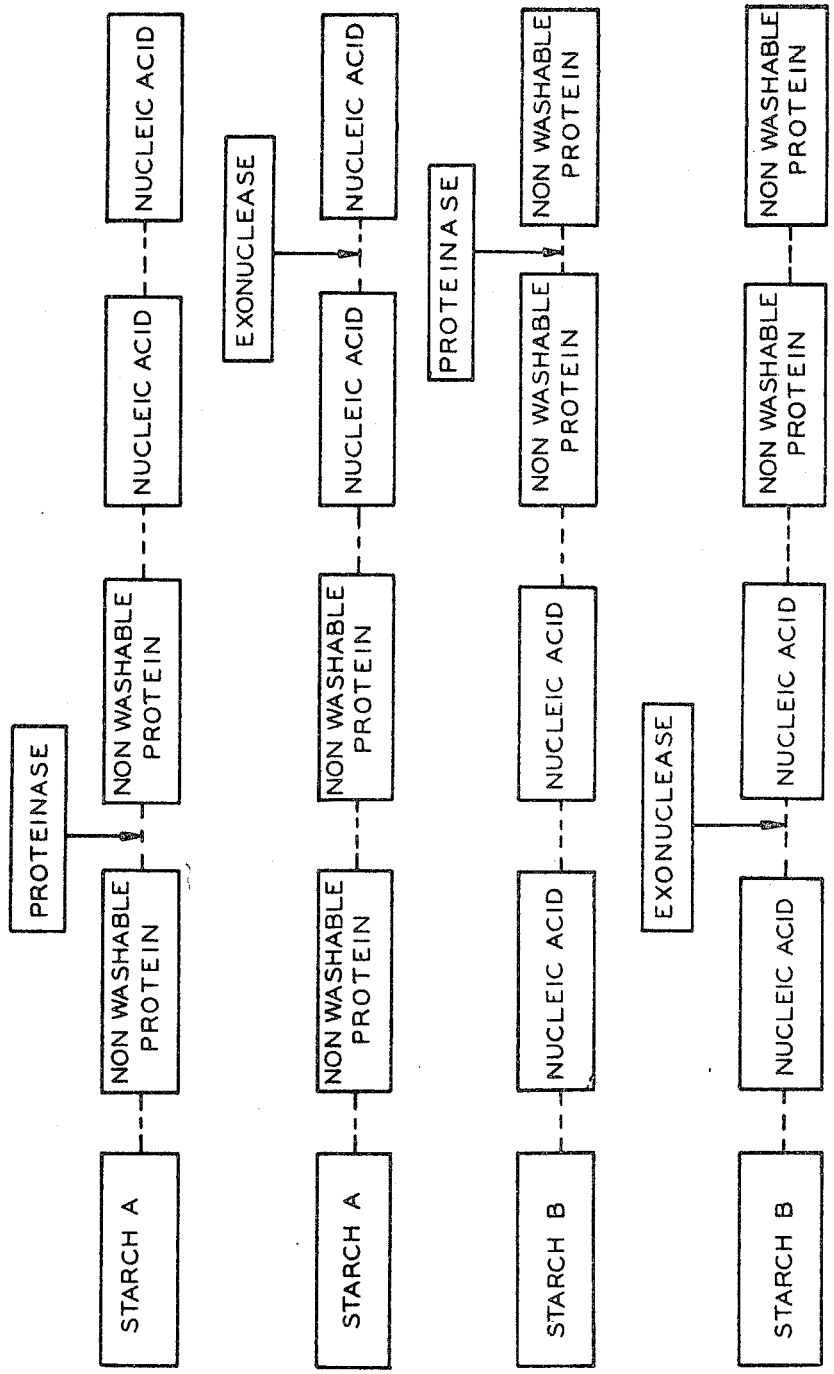
FIGURE 4 is a diagram illustrating our theory of the removal of atypical constituents of a molecule by the use of enzymes not having specific activity toward such constituents.

Starch B of FIG. 4, however, represents a starch wherein a distal non-washable starch-complexed protein is attached to the starch via promixal nucleoprotein. In such case a proteinase, by catalyzing the hydrolysis of amide bonds, would effect the removal of the distal protein but would leave the proximal nucleic acid-nucleoprotein attached to the starch. On the other hand, an exonuclease reacting with starch B would catalyze the degradation of the nucleic acid and thus remove both the nucleoprotein and the distal protein moieties from the starch.

Thus, in accordance with the theoretical example of FIG. 4, a proteinase would remove both non-washable starch complexed protein and nucleic acid-nucleoprotein from starch A while an exonuclease would remove only nucleic acid-nucleoprotein. With starch B, a proteinase would remove only non-washable starch-complexed protein while an exonuclease would remove both non-washable starch-complexed protein and nucleic acid-nucleoprotein. Practically, starches represent various mixtures of such theoretical starches and therefore one could not known, prior to actual testing, how much nucleic acid-nucleoprotein, if any, would be removed from a given starch by the action of a proteinase; or predict how much non-washable starch-complexed protein, if any, would be removed from a given starch by the action of an exonuclease. As will be pointed out later, potato starch represents an exceptional situation in that an exonuclease can remove substantially all nucleoprotein and substantially all non-washable starch-complexed protein. And as will also be pointed out, this fact leads to unique cooking properties of potato starch.

The above discussion in connection with FIG. 4 illustrates other similar anomalies which may be observed. For example, a lipoprotein residue can provide means for bringing lipids and proteins into the same molecular network.

Figure 5:
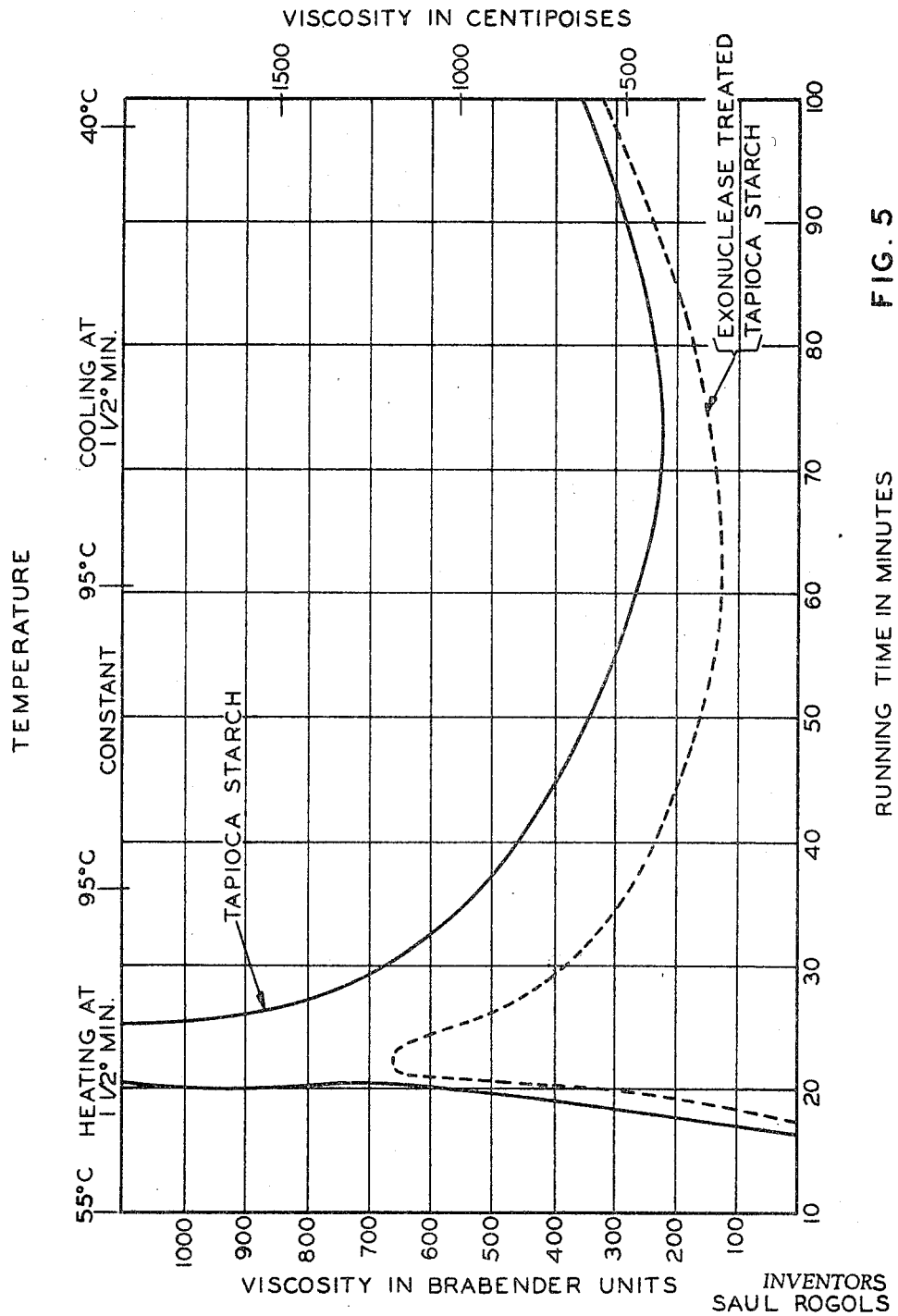
FIGURE 5 is a graph illustrating the cooking properties of tapioca starch following activation of the starch by treatment with an exonuclease.

Referring again to the drawings, FIG. 5 is, as stated above, a graph illustrating the cooking properties (Brabender) of tapioca starch following activation of the starch by treatment with an exonuclease. It may be noted that the peak viscosity (660) of the activated tapioca starch is considerably lower than the peak viscosity (about 1500) of commercial tapioca starch.

Figure 6:
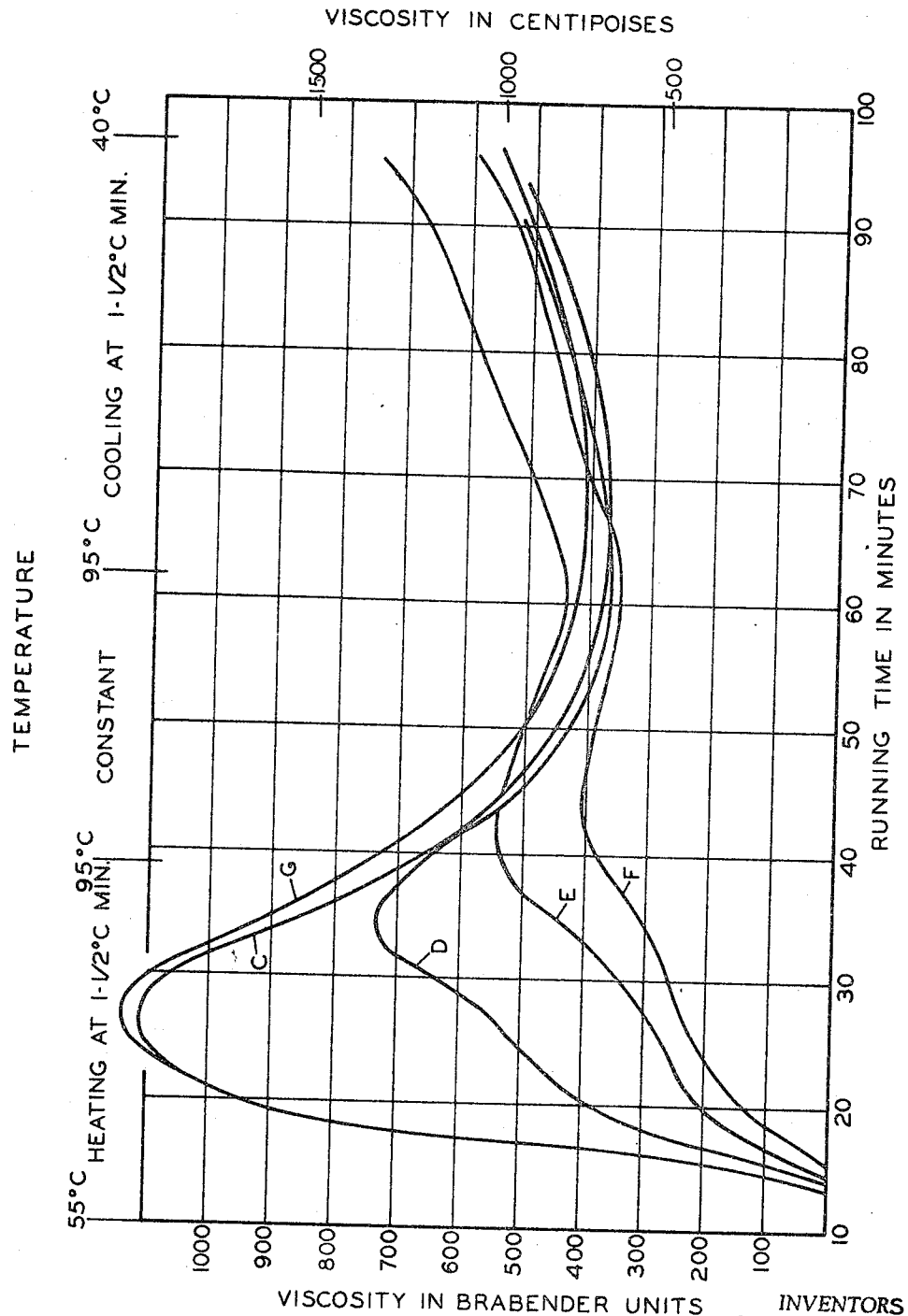
FIGURE 6 is a graph similar to FIGURE 5 dealing with potato starch.

FIG. 6 is similar to FIG. 5 except that FIG. 6 deals with potato starch. FIG. 6 compares the cooking properties of (1) a commercial potato starch (line C); (2) said potato starch activated by the simultaneous treatment with a proteinase, lipase, and exonuclease (line E); (3) said potato starch activated by the sequential treatment with a lipase, a proteinase, and an exonuclease (line F); and (4) said commercial potato starch when thoroughly washed (line G). It will be seen that the use of an exonuclease alone (wherein the starch product had substantially zero protein) reduced the peak viscosity from about 1160 to about 740 (line D); that the simultaneous use of lipase, proteinase, and exonuclease (wherein the residual protein was 0.068%) reduced the peak viscosity from about 1160 to about 770 (line E); and that the sequential use of a lipase, proteinase, and exonuclease (wherein the residual protein was 0.043%) reduced the peak viscosity from about 1160 to about 480 (line F). Washing the starch in the absence of enzymes (line G) had no significant effect. Thus use of the enzymes sequentially had a greater activating effect on the potato starch than the use of an exonuclease alone even though protein removal was more complete in the latter case.

Figure 7:
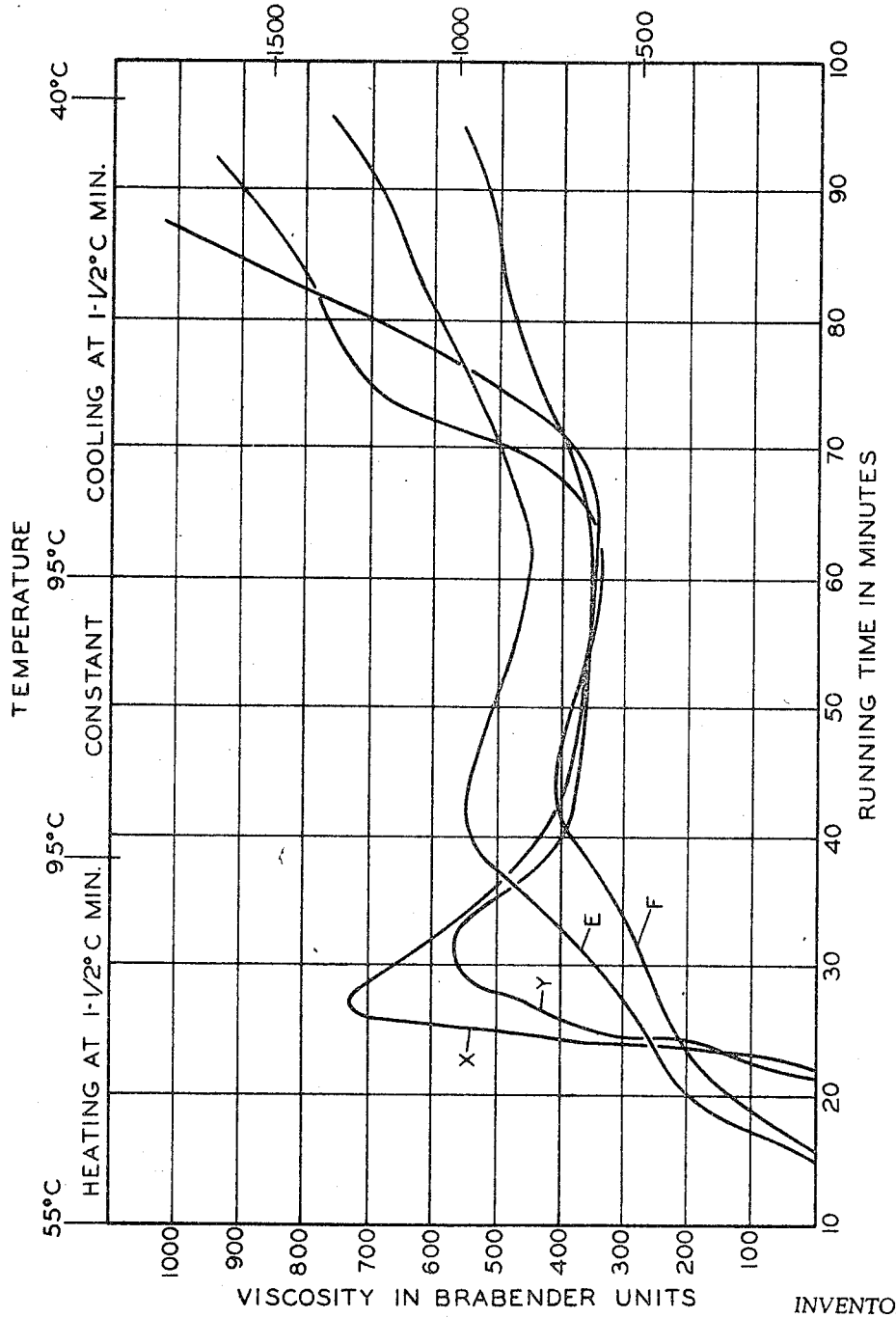
FIGURE 7 is a graph showing a comparison of the cooking results obtained with activated potato starch with those of activated corn starch.

In FIG. 7 we show a comparison of the cooking results obtained with activated potato starch (as shown in FIG. 6) with corn starch which has undergone similar treatment. Thus the potato starch of line E and the corn starch of line X represent starches activated by the simultaneous use of a lipase, proteinase, and exonuclease. Similarly, the potato starch of line F and the corn starch of line Y represent starches activated by the sequential use of lipase, proteinase, and exonuclease. Thus we have found that the cooking properties of potato starch, and of other tuber starches, when activated by the methods of our invention, approach the cooking properties of corn starch.

The changes in cooking properties indicated by FIGS. 5–7 suggest that the removal of nucleoprotein and the manner of its removal selectively activates those reaction sites which influence associative forces controlling the compactness of the starch molecule. In this manner, the comparatively open structure of the potato starch granule approaches the relative compactness of the corn starch granule.

The concentration of enzyme used in the methods of the invention depends upon the particular enzyme, upon the type of starch being treated, and to some extent upon the purpose of the worker carrying out the reaction. In this connection, we hesitate to use the expression "optimum concentration" since economics may dictate a relatively low concentration of enzyme and a long reaction time in one instance and may dictate a relatively high concentration of enzyme and a shorter reaction time in another instance. Therefore, we will give as a guide to the practice of our invention some examples of concentrations of enzymes with starch which have proved satisfactory for most of our operations. Enzyme technology, however, is now a well developed art and those skilled in this art will find it relatively easy to establish an optimum concentration as well as a minimum concentration of enzyme for any particular molecular fragmentation process of interest by merely selecting a specific enzyme and a specific starch and carrying out a few test reactions at various enzyme concentrations. For example, in the treatment of wheat starch with a lipase such as steapsin, it has been found that an enzyme level of 0.0015% based on the weight of the starch is satisfactory. However, in the treatment of either corn starch or waxy maize starch with such a lipase, it has been found that an enzyme level of 0.003% of the starch weight is required for comparable results.

It is also desirable that the proteolytic enzyme be used in a concentration which is dependent upon the kind of starch being treated, upon the kind of enzyme used, and upon the use intended for the treated starch. Thus, for wheat starch we prefer to use either pepsin or trypsin at a level of about 0.026% of the starch weight; for corn starch we prefer to use either trypsin at a level of 0.026% or papain at a level of 0.40%. For waxy maize starch we prefer to use either 0.40% papain or 0.026% chymotrypsin. For tapioca starch we prefer to use either 0.026% pepsin or 0.20% bromelain. For potato starch we prefer to use 0.026% chymotrypsin, 0.20% bromelain, or 0.026% pepsin. For tapioca starch; 0.20% bromelain, 0.026% trypsin, or 0.026% pepsin is satisfactory. In view of the use in the prior art of pepsin in a concentration of about 0.0004% (based on pure pepsin) to remove washable protein from corn starch, it may be noted that a minimum of about 0.008% of pepsin (about 20 times as much) is required before the removal of any significant proportion of intrinsic atypical protein is observed and that proportions of pepsin of about 0.03% (about 75 times as much) are considered satisfactory.

In the case of the reaction of exonucleases with a starch, a concentration of about 0.05% of phosphodiesterase, for example, is most suitable.

The pH range of the enzyme-starch reaction mixtures varies from 3.3 to 9.0 but the optimum pH for each enzyme is, of course, preferable. Such optimum pH ranges are well established for most enzymes. Thus, for pepsin, we prefer a pH of about 3.3, for papain we prefer a pH of about 4.5, for bromelain we prefer a pH of about 3.5, for trypsin we prefer a pH of 7.8, for chymotrypsin we prefer a pH of 8.0, for phosphodiestearase we prefer a pH of 8.8, and for steapsin we prefer a pH of 7.4. For a combination of enzymes, we prefer to use a pH intermediate the optimum pH of the various enzymes. Thus, for a combination of steapsin and trypsin we prefer a pH of about 7.6, and for a combination of steapsin, trypsin, and phosphodiesterase we prefer a pH of about 8.1.

The temperature range of an enzymic reaction with atypical starch constituents may extend from about 20° C. to 60° C. It should not approach the gelatinization temperature of starch which is about 75° C. The optimum temperature of the different enzymes varies but is also well established in the art. Thus for pepsin we prefer to use a temperature of 52° C. and for papain, bromelain, and trypsin we prefer to use a temperature of about 53° C. For chymotrypsin we prefer a temperature of about 50° C. For steapsin we prefer to use a temperature of about 37° C. and for the combination of steapsin and trypsin we prefer a temperature of from 40° C. to 45° C.

The time of reaction depends upon the temperature, the pH, the kind and amount of enzyme used, and the extent of activation desired. Thus with various combinations or conditions, the reaction may be accomplished within two hours, or under other conditions it may take up to 11 hours. We have found, however, that the best control on the degree of activation desired requires, in most cases, a reaction time of at least 3 hours with most of the enzymes which we have used.

At least mild agitation is preferred. Severe agitation is not required, but it is necessary that the enzyme be kept in contact with the starch so that the reactions may be accomplished efficiently.

The reaction may be stopped by deactivation of the enzymes in various ways. For example, the pH of the mixeure may be changed to one at which the enzymes are deactivated; the temperature may be changed to a temperature at which the enzymes are deactivated; or a suitable mineral salt may be added. In the deactivation of pepsin we have used mercuric chloride and have also stopped the reaction by adjusting the pH to about 7.0. In the deactivation of papain we have stopped the reaction by adjusting the pH to 7.4. In the deactivation of bromelain we have stopped the reaction by adjusting the pH to 7.8. In the deactivation of trypsin we have stopped the reaction by decreasing the pH from 7.8 to about 4.4. In the reaction of chymotrypsin we have stopped the reaction by decreasing the pH from 8.0 to about 4.5. In the reaction with steapsin we have stopped the reaction by decreasing the pH from 7.4 to about 4.4 by the addition of a mild acid, for example, trichloroacetic acid.

Instead of a single lipase, a single proteinase, or a single exonuclease, in each of the above described processes we may use, respectively, a combination of two or more lipases, two or more proteinases, or a combination of two or more exonucleases to achieve specific desirable results.

Our surprise at the variety of controllable states of activation and at the unexpected and rather dramatic appearance of unique properties in the natural products treated in accordance with the principles of our invention has led to speculation on the reason for these changes, on the reason why the constituent altered and the method of alteration both appear to be critical for attaining a unique activation of the natural product molecules, the reason why the method does not work on synthetic molecules of comparable purity, the reason why the method does not work when applied to physically associated impurities, and the reason why the removal of atypical molecular fragments by alternative methods (e.g., by solvent extraction) does not give the desired result.

Although we do not wish our invention to be limited by theoretical considerations, we believe such speculation may be helpful to those skilled in the art in understanding the invention. One theory is as follows:

Many of the chemical entities found in natural products of various degrees of purity consists of reactants in and products of the biochemical changes in the growing plant which, when once the biochemical process has stopped, are associated with the selected natural product in only a physical sense and do not exert any significant associative molecular forces on it. The removal of such entities (which may be salts, low molecular weight carbohydrates, aldehydes, soluble proteins, or a myriad of other inorganic and organic entities) is therefore relatively simple and is usually accomplished by washing with water. The removal of such entities may also be considered as the removal of "impurities" since their removal merely yields purer and purer material with substantially predictable changes in properties.

The constituents we are concerned with, however, differ from the foregoing "impurities" in at least four important ways.

First, they are not merely physically associated with the natural product molecules but are intrinsic constituents thereof; that is, they are bound to the molecule, either directly or indirectly, in a manner such that their presence influences the state of activation of reactive sites on the molecule. There have been advanced in the literature a number of theories as to how (in the case of starch, for example) such non-carbohydrate moieties might be encompassed within the molecular network of the starch so as to influence the energy status of the starch molecule when the latter takes part in a specific chemical reaction. It has been suggested, for example, that peptide moieties might be attached to a carbohydrate moiety via an adenosine diphosphate-glucose bridge and, further by way of example, that lipids may be essentially peripheral constituents bound only indirectly and relatively more loosely into the starch molecular network, perhaps via lipoprotein fragments. It appears from our studies on the relative rates of degradation, or molecular fragmentation, of the various non-carbohydrate constituents of starch that the lipids are degraded relatively rapidly and therefore are probably situated peripherally whereas the nucleoproteins are degraded very slowly and therefore are probably situated deep within the starch granule.

Figure 2:
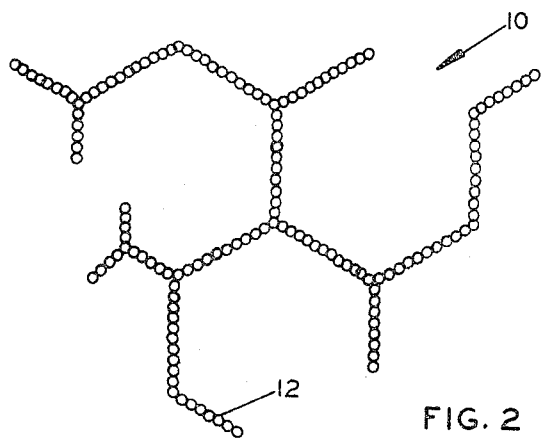
FIGURE 2 is a symbolic representation of a large molecule containing no atypical intrinsic constituents.
Figure 3:
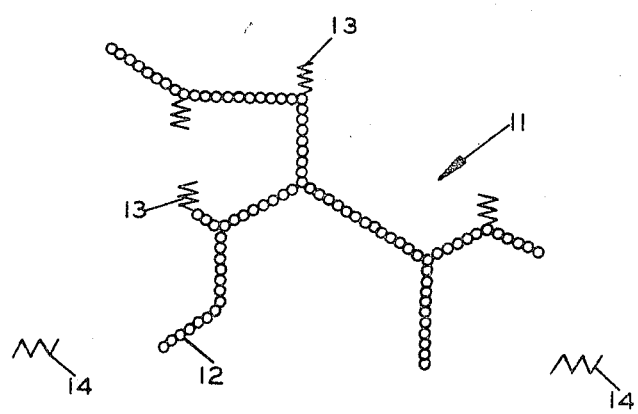
FIGURE 3 is a symbolic representation of a large molecule similar to that shown in FIG. 2 except that atypical intrinsic fragments and atypical physically associated impurities are shown.

In FIGS. 2 and 3 we illustrate the foregoing. In FIG. 2 we show symbolically a molecule 10 which contains no atypical intrinsic constituents, and in FIG. 3 we show symbolically a molecule 11 which contains atypical intrinsic constituents. The molecules 10 and 11 comprise units 12 of atypical constituent (for example, hexose units in the case of starch). Molecule 11 includes an atypical intrinsic constituent 13 (for example, protein in the case of starch). Also shown in FIG. 3 are physically associated impurities 14 which may be identical in structure to the intrinsic constituent 13 except that the latter is bound to the molecule and the former is not. It may be noted that, symbolically, the molecule 10 (FIG. 2) is shown quite regular in pattern whereas the molecule 11 (FIG. 3) is shown as quite distorted by the presence of the atypical constituents.

A second way in which the intrinsic constituents of interest differ from physically associated impurities, using starch by way of example, is that there appears to be reactive sites occurring on these non-carbohydrate constituents and, therefore, complete removal of one of these constituents is not necessarily more satisfactory than its partial fragmentation or alteration.

A third way in which the intrinsic constituents of interest differ from physically associated impurities lies in the fact that their selective degradation by the methods of the present invention can provide for the availability of additional energy of activation for reactive sites on the balance of the altered molecule. To appreciate this fact it must first be recognized that the degradation reactions herein accelerated by enzymes are, in all instances, spontaneous chemical reactions; that is, they are negative free energy reactions capable, if suitably harnessed, of doing work. For example, the peptide bonds of protein required energy for their original synthesis in the growing plant and, in a sense, stored this energy for its subsequent release. If the peptide bonds which are being broken occur in a protein "impurity" (for example, in structure 14 of FIG. 3), there is no way to transfer the free energy of the reaction to a starch molecule (for example, molecule 11 of FIG. 3) lying in the vicinity. If, however, such peptide bonds are part of the molecular network of the starch molecule (as in fragment 13 of FIG. 3), the rupture of such bonds and the subsequent re-orienting of the molecule can transfer energy (increased vibrational energy, electron shifts, changes in hydrogen bonding, etc.) to another part of the molecule, and specifically to a reactive site. It appears therefore that we have found a way of harnessing part of this available energy to a useful purpose by the selective piece-meal breaking, or step-wise degradation, of the energy-containing bonds rather than by removing the intrinsic constituents by an alternative method (e.g., solvent extraction) which does not permit of such step-wise energy utilization.

It is our belief that there is a fourth way in which the intrinsic constituents of interest differ from physically associated impurities in that the intrinsic constituent need not necessarily be removed but can be added to or replaced by another atypical moiety which then becomes an intrinsic fragment of the molecule of interest. In connection with this latter type of configuration change (the synthesis of a molecule containing an added atypical molecular fragment), it is not wholly apparent why such an enzymic process should require that the starting molecule contain atypical fragments with spontaneously degradable bonds. First, it is our opinion that the normally present atypical molecular fragments "preserve" active sites for such synthesis; that is, the presence of the fragments maintains a unique configuration for the molecule (for example, molecule 11 of FIG. 3 as opposed to molecule 10 of FIG. 2), which configuration provides for active or potentially active sites not present in some alternative configuration. Particularly, such sites appear to be absent from comparable synthetic molecules. Second, it is also our opinion that the fact that the atypical fragments are spontaneously degradable provides for a pathway for the delivering of energy for the synthesis. It will be apparent to those skilled in the art that a synthesis resulting in the formation of a spontaneously degradable bond will require energy and that such energy must be supplied via a coupled reaction. The presence of spontaneously degradable bonds in the atypical portion of the molecule appears to provide, in a manner not entirely clear to us, for such coupling.

Thus, the atypical intrinsic molecular fragments which become the substrates for enzymic attac herein form a unique class of materials in that they are (1) atypical fragments of a molecule; (2) intrinsic constituents of that molecule such that their partial or complete removal changes the steric configuration of the molecule; (3) spontaneously degradable constituents with the capacity of transfer energy of degradation to other sites on the molecule; and (4) constituents subjects to overwhelming competition by physically associated impurities of equal specificity if such impurities are present in significant proportions.

In connection with enzymic attack on an "atypical" constituent of a physically associated impurity in the chemical environment of a natural product molecule (as opposed to being an intrinsic constituent of that molecule), we are aware that prior art methods have resulted frequently in the bringing together of a natural product and an enzyme for the reason that it has long been known that enzymic degradation can be used as a purification method. Thus proteolytic enzymes have been used to strip meat from bones; to solubilize protein in starch and flour; to remove incrustations from cellulose fibers; and, in the case where the natural product is itself an enzyme, to use a proteinase to change the activity of such enzyme. Such processes have been extremely valuable because, generally, they provide one with a relatively purer and generally more manageable product and, in particular, they can provide natural products of suitable purity for our process.

Thus Prucha et al. (U.S. 1,582,537) desired to remove protein from corn starch with pepsin so that sugar made from such starch would not be discolored and require filtration through bone black. Lenders et al. (U.S. 1,417,467) used a proteolytic bacteria with corn starch for a similar reason. In the Lenders process, the removal of protein impurity from starch effected, when the starch was hydrolyzed, the production of less "hydrol" and thus a sugar product with a high percentage of dextrose (as much as 98% dextrose in the product). It should be noted that the Lenders figures refer to percentages of the product whereas in our examples dealing with starch hydrolysis the DE figure (the reducing sugars) is based on the starting material. Denton et al. (U.S. 3,098,014) discusses the enzymatic removal of meat from bones. Klopfer (U.S. 1,013,497) shows the treatment of wheat flour with an enzyme to "loosen" the gluten cells. Campbell (British 182,829 issued Jan. 11, 1921) also treats wheat flour with a proteolytic enzyme to reduce the gluten concentration in the resulting starch. Stuck (U.S. 2,839,398), Ritter (U.S. 2,193,493), and Hollander et al. (U.S. 1,842,024) describe processes wherein a bacteria or enzyme is used to remove incrustations from cellulose fibers. Greenwood et al. (J. Institute of Brewing, LXXI, 405–417, 1965) described the use of trypsin to reduce the activity of alpha amylase (the protein of the amylase, the typical constituent, being subject to the proteinase attack and the proteinase not attacking any atypical constituent).

These prior art methods which involve the use of enzymic reactions in purification procedures can properly be referred to as selective for the reason that enzymes have specificity of reaction. We also use enzymes in this same "selective" sense because enzymes used in our method maintain their well known specificity (except as illustrated in FIG. 4). However, we use an enzyme in an additional selective manner; that is, in a manner where we direct its action toward but one of several potential substrates. The enzyme may have equal specificity to each of the several potential substrates but the substrates may have different degrees of availability to the enzyme. Three such "degrees of availability" can be illustrated (assuming equal specificity in each instance). First, the molecules of a soluble substrate (e.g. a soluble protetin) would be immediately available for reaction with a soluble enzyme and such reactions can proceed with relative rapidity. Second, an insoluble, but otherwise pure, substrate (e.g. a similar but insoluble protein) would be relatively slower to react with an enzyme because of the difficulty of bringing the substrate molecule into contact with the enzyme. Thus, in the presence of both soluble and insoluble substate, an enzyme can be completely spent by reaction with a soluble substrate before any measurable reaction with insoluble substrate has occurred. The third alternative, and the one of interest herein, occurs when the substrate is a molecular fragment of a molecule of another substance (e.g. a protein fragment of a starch) and hence much more remote from contact with the enzyme. In a competitive situation (that is, in the presence of (1) soluble substrate; (2) insoluble but otherwise pure substrate; and (3) atypical substrate bound to a typical molecule); an enzyme equally specific to all three might be used up in reaction with the first, or with the first two, and would have little or no chance to react with the third substrate unless this latter reaction was specifically intended and specifically provided for. By a "substantially pure" natural product we mean, therefore, one which has been sufficiently purified of such physically associated competitive substrates in order to avoid the depletion of a selected enzyme before it has had an opportunity to effect the desired selective enzymic attack on the atypical intrinsic molecular constituent. In this sense, an enzyme is selective in at least two ways. First and in the classical sense, it is selective because it has specific activity toward a specific bond. Second, it is selective in our invention because its activity is directed toward a bond in a specific and comparatively remote location.

Starch hydrolysates, usually prepared by the acid hydrolysis or the enzymatic hydrolysis of a commercial starch, are common materials of commerce. Users of such hydrolysates are most often interested in specific values of any one or more of several characteristics: sweetening power, fermentability, ratio of the various saccharides, and the like. Thus, the extent and type of the hydrolysis reaction is determined by the requirements of the user and can be quite varied.

It is a common process to start with one of these starch hydrolysates to hydrolyse it further by either acid hydrolysis or enzymatic hydrolysis. For example, it is quite common for dextrose producers to hydrolyse further the polysaccharides in an already partially hydrolysed starch, or starch hydrolysate.

The following are representative examples of ways in which the methods of our invention may be carried out.

Examples 1–9 illustrate the effect of a lipase on starch and an altered activation which manifests itself during subsequent hydrolysis of the starch.

EXAMPLE 1

0.075 gram of steapsin were dispersed in 100 mls. of 0.02 M $NaH_2PO_4$ and the solution was buffered at pH 7.40 by the use of the required quantity of 1 M $Na_2HPO_4$. Then the solution was allowed to stand 18–24 hours prior to use. 200 gms. of wheat starch were slurried in 1666 mls. of distilled $H_2O$. The pH was adjusted to 7.40. The slurry was heated to 37° C. and the pH rechecked. To the slurry was added 8.24 mls. of the lipase (steapsin) solution so that the amount of enzyme equalled 0.0031% of the starch by weight. The reaction then proceded for 3½ hours and was stopped using a 1 ml. of 10% trichloroacetic acid. The starch was filtered and washed with water. The result, a reduction in lipid content from 0.82% to 0.40%, may be seen in Table 1.

The example was repeated using 0.0015% steapsin with wheat starch, 0.0062% steapsin with wheat starch, 0.0031% steapsin with pearl corn starct, 0.0015% steapsin with pearl corn starch, 0.0031% steapsin with waxy maize starch, 0.0015% steapsin with waxy maize starch, 0.0031% steapsin with potato starch, and 0.0015% steapsin with tapioca starch. The lipid contents of the final products are shown in Table 1.

EXAMPLE 2

12 grams of the wheat starch which had been treated with 0.0051% steapsin (Example1) were slurried in 38 mls. of distilled water. The slurry was heated to 40° C. To the slurry was added 10 mls. of 1% HCl solution (37% concentration). Hydrolysis proceeded for 1.5 hours at 38–40° C. after which time the slurry was neutralized by adjusting the pH to 7.0 by addition of NaOH. The results, an increase in Ostwald fluidity from 0.60 to 0.92 may be seen in Table 2. The example was repeated using a pearl corn starch which had been treated with 0.0031% steapsin, using a waxy maize starch which had been treated with 0.0031% steapsin, using a potato starch which had been treated with 0.0015% steapsin, and using a tapioca starch which had been treated with 0.0015% steapsin. Results in terms of altered Ostwald fluidity can be seen in Table 2.

EXAMPLE 3

200 gms. of lipase treated pearl corn starch, treated as explained above in Example 1 and having a lipid content of zero, were slurried in 300 mls. distilled water. The pH was adjusted to 6.80, and 0.08 gm. of a commercially produced amylase were added. The slurry was heated to 72° C. and held for 15 minutes. It was then cooled to 60° C. with the pH being adjusted to 4.40. Then 0.20 gm. of a commercially produced amyloglucosidase were added and the reaction was allowed to proceed for 12 hours at 60° C. The temperature was then raised to 85° C. and held for 5 minutes, followed by cooling. A dextrose determination was carried out on the resulting syrup using the method of Munson & Walker (Handbook of Chem. & Phys., 44th ed. 1962, 1776–1780). Results may be seen in Table 3.

EXAMPLE 4

Example 3 was repeated except that the amyloglucosidase concentration was doubled (to 0.04 gram). A control run using untreated pearl corn starch was also carried out (see Table 3).

EXAMPLE 5

120 grams of lipase treated pearl corn starch, as prepared in Example 1, were slurried in 150 mls. distilled water. To this was added 186 mls. of 1% HCl to bring the mixture to a pH of 1.5. The slurried mixture was heated to 85–90° C. and held for 6 hours. It was then cooled to 54° C. and the pH adjusted to 5.0. 0.03 gm. of a commercially produced glucogenic alpha amylase were added and the reaction proceeded at 54° C. for 12 hours. It was stopped by adjusting the pH to 7.50. A dextrose determination was carried out on the resulting syrup. Results may be seen in Table 3.

EXAMPLE 6

60 gms. of pearl corn starch were slurried in 300 mls. of distilled water. The pH was adjusted to 6.8. The slurry was heated to 37° C. Steapsin, prepared as in Example 1, was added to the slurry in the proportion of 0.04% of the weight of the starch. The reaction proceeded for 7 hours. The reaction mixture was then adjusted to a pH of 5.5 and was heated to 55° C. A dextrinase was added in the proportion of 0.04% of the weight of the starch. Hydrolysis was permitted to continue for 36 hours. A dextrose determination was carried out on the resulting mixture. Results may be seen in Table 3.

EXAMPLE 7

60 gms. of pearl corn starch were slurried in 300 mls. of distilled water. The pH was adjusted to 6.8 and the slurry was heated to 37° C. Steapsin, prepared as in Example 1, was added to the slurry in the proportion of 0.04% of the weight of the starch. The reaction proceeded for 7 hours. The reaction mixture was then adjusted to a pH of 5.5 and was heated to 60° C. A commercially produced amyloglucosidase was added in the proportion of 0.11% of the weight of the starch. Hydrolysis was permitted to continue for 12 hours. A dextrose determination was carried out on the resulting mixture. Results may be seen in Table 3.

EXAMPLE 8

200 grams of wheat starch were slurried in 1666 mls. .01 M tris-hydroxymethyl aminomethane (tris buffer) at a pH of 7.40. The slurry was heated to 37° C. and held at that temperature under constant agitation. In the meantime, an enzyme solution was prepared by dissolving 12.5 mgs. of lecithinase-C (phospholipase-C; Worthington) in a 1.00% egg albumin dispersion which was freshly prepared at a pH of 7.00 just prior to use. To the slurried starch was then added 0.4 ml. of 0.05 M $CaCl_2$, immediately followed by 8.0 mls. of the enzyme solution. The enzyme level in this case was 0.0005% based on the dry weight of the starch. The reaction proceeded 7 hours and was stopped using a pH adjustment to 6.5. The reacted slurry was filtered and washed. The example was repeated using corn; waxy maize; tapioca, and potato starches respectively. Results in terms of lipid content are shown in Table 4.

EXAMPLE 9

200 grams wheat starch were slurried in 1666 mls. distilled $H_2O$. The pH was adjusted to 7.40 using 1 N NaOH. In a constant temperature bath, the slurry was agitated constantly and heated to 40° C. Enzyme preparation was as follows: 0.5 gm. wheat germ lipase (Worthington) was dissolved in 100 mls. .075 M $NaHCO_3$ previously buffered at 7.40 pH, using $Na_2HPO_4$ as a concentrated salt. The enzyme solution was allowed to stand 1 hour prior to use. To the starch slurry was added 3.6 mls. of the enzyme solution equal to 0.009% based on starch weight. The reaction proceeded 9 hours and was stopped using 2 mls. 10% trichloracetic acid. The product was filtered and washed. The example was repeated using corn, waxy maize, tapioca, and potato starches respectively. Results in terms of lipid content are shown in Table 4.

EXAMPLE 10

This example deals with the alteration of atypical protein which is intrinsically bound to starch molecules.

177 grams thick wheat starch were slurried in 1822 mls. of metal free distilled water. The pH was adjusted to 3.30 with 0.5 N HCl. The slurry was heated to 52° C. at which temperature 0.0462 gram pepsin (3× cryst.—B grade, swine mucosa), representing 0.026% of the starch weight, was added. The reaction proceeded for 2½ hours with mild agitation, after which time it was stopped by using mercuric chloride. The resulting mixture was then filtered and washed twice with distilled water and once with acetone. The results may be seen in Table 5. Table 5 shows the protein and ash contents of untreated starches and of various starches treated with various proteinases. The enzyme levels and the pH used in these examples are typical of those found quite satisfactory. For these tables, ash determinations were carried out at 1700° F. for 1 hour using platinum crucibles. Protein determinations were carried out by the Kjeldahl-Gunning method for nitrogen determination (Official Methods of Analysis of the Association of Official Agricultural Chemists, edited by Henry A. Lepper, 74th Edition (1950), Pages 13–15, incl.) and subsequent protein estimation.

The increase in burst strength, tensile strength, and tear strength of paper made with the altered starch is shown in Table 6.

The example was repeated using all combinations of 0.026% pepsin, 0.400% papain, 0.002% bromelain, 0.026% trypsin, 0.02% alpha-chymotrypsin, and 0.006% carboxypeptidase with wheat, corn, waxy maize, tapioca, and potato starches. The example was also repeated using 0.026% peptidase with wheat starch. Alterations in protein and ash content is shown in Table 5.

EXAMPLE 11

This example deals with the alteration of atypical nucleoprotein which is intrinsically bound to a starch molecule.

125 gms. wheat starch were slurried in 1100 mls. distilled water. The pH was adjusted to 8.80 using 2 N NaOH. The slurry was constantly agitated at 28° C. The enzyme mixture was prepared as follows: 0.05 gm. of a phosphodiesterase (lyophilized from *Crotalus adamamtus* venom) was dispersed in 100 mls. 0.1 M magnesium hydroxide and the pH was adjusted to 8.80 prior to addition. The mixture was allowed to stand for 6 hours in the cold prior to its use. To the slurried starch was added 25 mls. 0.2 M magnesium acetate followed by an additional pH adjustment to 8.80. 100 mls. of the enzyme dispersion were then added. The reaction proceeded at 28° C. for 12 hours and was halted by adjusting the pH to about 6.5. Suitable controls were carried out using identical reaction conditions only in the absence of any enzyme material. The reacted products were filtered, washed and dried. Results in terms of final proteins and lipid analyses are shown in Table 7. In some instances; for example, wheat starch; the total altered protein may be nucleoprotein since comparable amounts of nitrogen bases appear in the final sample.

The example was repeated using corn starch, waxy maize starch, tapioca starch, and potato starch, respectively. Results can be seen in Table 7.

EXAMPLE 12

This example shows the treatment of a starch with two enzymes in sequence. First, papain is used to alter atypical intrinsic protein fragments, and then steapsin is used to alter atypical intrinsic lipid fragments.

600 gms. of pearl corn starch were slurried in 2400 mls. distilled water. The pH was adjusted to 4.3 using 1 N NCl. To the slurry was added 2.4 gms. of papain, 0.7 ml. cysteine (.01 M) and 0.4 ml. EDTA (.05 M). The reaction proceeded for 4.5 hours at room temperature with mild agitation and was stopped by adjusting the pH to 6.0 using 1 N NaOH. The slurry was then agitated further for ½ hour after which the pH was adjusted to 7.40. It was then heated to 40° C. At this point 16.5 mls. (0.075 gram steapsin) of a steapsin solution, prepared as in Example 1, were added. The reaction then was permitted to proceed for 9 hours. It was then stopped using 2 mls. of 10% trichloroacetic acid. The resulting starch was filtered out and was washed using one liter distilled water. It was then air dried. The results are shown in Table 9.

EXAMPLE 13

This example shows the simultaneous use of three different enzymes to alter three different types of atypical intrinsic fragments of the starch molecule.

200 grams potato starch were slurried in 1700 mls. distilled water. The pH was adjusted to 7.60 using 0.5 N NaOH. The temperature was stabilized at 40° C. and the pH at 7.60 for 1 hour prior to any additions. Simultaneously, the following enzymes were added at the stated levels:

| Amount (mls.): | Enzyme solution | Level (percent of starch) |
|---|---|---|
| 32 | Wheat germ lipase | .009 |
| 150 | α-Chymotrypsin | .052 |
| 100 | Phosphodiesterase | .040 |

The enzymes were prepared as follows:

(a) Wheat germ lipase: 0.05 gm. (2× crystalline-Worthington Biochem.) were dissolved in 100 mls. 0.075 M $NaHCO_3$ buffered at 7.40 with $NAH_2PO_4$ and allowed to stand 1 hour in the cold prior to use.

(b) α-chymotrypsin: 0.104 gm. of the enzyme (3× crystalline, the salt free form from methanol at 11,000 μ./mgs.) were dispersed in 150 mls. of tris buffer at 8.00 pH.

(c) Phosphodiesterase: 0.08 mg. of a lyophilized phosphodiesterase from *Crotalus atrox* venum were dispersed in 100 mls. of 0.1 M. magnesium hydroxide. The pH was adjusted to 8.80 using magnesium acetate.

The reaction proceeded 12 hours after which time 2 mls. of 10% trichloroacetic acid were added. The product was filtered, washed with 2 liters of distilled water, then with 0.5 liter acetone, and was then air dried. The Brabender cooking properties of the altered starch product were determined (line E of FIGS. 3 and 4). Analysis of the product is shown in Table 8. A parallel reaction was carried out which contained all the reagents except the enzymes. The product of the parallel reaction has been referred to herein as "washed" potato starch (line G of FIG. 3).

EXAMPLE 14

This example is provided in order to show the comparison of the altered potato starch product of Example 13 with a corn starch which has been similarly treated. 200 gms. pearl corn starch were slurried in 1700 mls. distilled water. The pH was adjusted to 7.60 using 0.5 N NaOH. The temperature was brought to 40° C. Both temperature and pH were then stabilized at 7.60 and 40° C. Simultaneously, the following enzymes were added at the stated levels:

| Amount (mls.): | Enzyme solution | Level (percent of starch) |
|---|---|---|
| 16.52 | Steapsin | .0124 |
| 150 | Trypsin | .052 |
| 100 | Phosphodiesterase | .040 |

The enzyme solutions were prepared as follows:

(a) Steapsin: .075 gm. lipase (steapsin—General Biochem.) were dispersed in 100 mls. 0.02 M $NaH_2PO_4 \cdot H_2O$ buffered at 7.40 pH using $Na_2HPO_4 \cdot 7H_2O$.

(b) Trypsin: 0.104 gm. trypsin (2× crystalline—salt free at 8000 μ./mg.) were dissolved in 150 mls. distilled water at a pH of 7.80.

(c) Phosphodiesterase: Prepared as in Example 13.

The reaction proceeded 12 hours after which time 2 mls. 10% trichloroacetic acid were added. The product was washed with 2 liters of distilled water, then with 500 mls. acetone, and was then air dried. Analysis of the treated corn starch is shown in Table 8. The Brabender cooking properties of the altered corn starch were determined (line X of FIG. 4). It will be seen that the treatment of Examples 13 and 14 causes the cooking properties of potato starch to approach those of a cereal starch, the peak viscosity (540) of the treated potato starch (line E, FIGS. 11–12) actually being lower than that (730) of the treated corn starch (line X, FIG. 4).

EXAMPLE 15

This example is similar to Example 13 except that herein the three enzymes are added sequentially.

Potato starch (400 gms.) was slurried in 2 liters of distilled water. The pH was adjusted to 7.60 and the slurry heated to 40° C. To the mixture was added 32 mls. of a wheat germ lipase solution, prepared as in Example 13. The reaction proceeded 10 hours and was then adjusted to a pH of 8.00. Next, 150 mls. of an α-chymotrypsin, prepared as in Example 13, were added. After a reaction time of 10 hours, the pH was then readjusted to 8.80 followed by the addition of 100 mls. of a phosphodiesterase solution, prepared as in Example 13. After an additional reaction time of 10 hours, 2 mls. of 10% trichloroacetic acid were added and the product was filtered, washed with 1 liter of distilled water and 0.5 liter of acetone, and was air dried. The Brabender cooking properties of the resulting starch were determined (line F of FIGS. 3 and 4). Analysis of the product is shown in Table 8. A parallel reaction was carried out which contained all the reagents except the enzymes. The product of the parallel reaction has been referred to herein as a "washed" potato starch and had essentially the same properties as the "washed" potato starch of Example 13 (line G, FIG. 3).

TABLE 1.—LIPASE

| Starch | Enzyme level, percent | Percent residual lipids (ether extractable materials) |
|---|---|---|
| Example: | | |
| Wheat | None | 0.82 |
| Corn | None | 0.65 |
| Waxy maize | None | 0.07 |
| Potato | None | 0.20 |
| Tapioca | None | 0.13 |
| 1 Wheat | .0015 | 0.09 |
| 1 do | .0031 | 0.40 |
| 1 do | .0062 | 0.46 |
| 1 Corn | .0031 | 0.00 |
| 1 do | .0015 | 0.08 |
| 1 Waxy maize | .0031 | 0.00 |
| 1 do | .0015 | 0.04 |
| 1 Potato | .0015 | 0.11 |
| 1 Tapioca | .0015 | 0.03 |

TABLE 2.—LIPASE

| Starch | Lipid content, percent | Ostwald fluidity |
|---|---|---|
| Example: | | |
| Wheat | 0.82 | 0.60 |
| Corn | 0.65 | 0.62 |
| Waxy maize | 0.17 | 0.50 |
| Potato | 0.20 | 0.33 |
| Tapioca | 0.13 | 0.40 |
| 2 Wheat | 0.09 | 0.92 |
| 2 Corn | 0.00 | 7.50 |
| 2 Waxy maize | 0.00 | 1.20 |
| 2 Potato | 0.11 | 0.47 |
| 2 Tapioca | 0.03 | 0.70 |

TABLE 3.—LIPASE

| Starch | Lipid content, percent | Percent of starch converted to dextrose |
|---|---|---|
| Example: | | |
| 3 Altered corn starch | 0.00 | 100 |
| 4 do | 0.00 | 88.3 |
| 4 Corn starch, control | 0.65 | 71.1 |
| 5 Altered corn starch | 0.00 | 37.6 |
| 5 Corn starch, control | 0.65 | 27.1 |
| 6 Altered corn starch | 0.05 | 97.0 |
| 6 Corn starch, control | 0.37 | 80.0 |
| 7 Altered corn starch | 0.05 | 66.0 |
| 7 Corn starch, control | 0.37 | 57.0 |

TABLE 4.—LIPASE

| | Starch | Lipase | Percent lipid control | Percent lipid altered starch |
|---|---|---|---|---|
| Example: | | | | |
| 8 | Wheat | Phospholipase-C | 0.80 | 0.66 |
| 8 | Corn | do | 0.65 | 0.26 |
| 8 | Waxy maize | do | 0.07 | 0.00 |
| 8 | Tapioca | do | 0.13 | 0.00 |
| 8 | Potato | do | 0.20 | 0.02 |
| 9 | Wheat | Wheat germ | 0.80 | 0.79 |
| 9 | Corn | do | 0.65 | 0.06 |
| 9 | Waxy maize | do | 0.07 | 0.01 |
| 9 | Tapioca | do | 0.13 | 0.02 |
| 9 | Potato | do | 0.20 | 0.08 |

TABLE 5.—PROTEINASE

| Starch | Proteinase | Percent protein control | Percent protein altered | Percent ash control | Percent ash altered |
|---|---|---|---|---|---|
| Wheat | 0.026% pepsin | 0.320 | 0.060 | 0.203 | 0.080 |
| Corn | do | 0.439 | 0.148 | 0.102 | 0.030 |
| Waxy maize | do | 0.670 | 0.439 | 0.561 | 0.031 |
| Tapioca | do | 0.145 | 0.108 | 0.209 | 0.023 |
| Potato | do | 0.140 | 0.081 | 0.234 | 0.081 |
| Wheat | 0.400% papain | 0.320 | 0.270 | 0.203 | 0.076 |
| Corn | do | 0.439 | 0.401 | 0.102 | 0.013 |
| Waxy maize | do | 0.670 | 0.549 | 0.561 | 0.001 |
| Tapioca | do | 0.145 | 0.000 | 0.209 | 0.095 |
| Potato | do | 0.140 | 0.127 | 0.234 | 0.183 |
| Wheat | 0.200% bromelain | 0.320 | 0.130 | 0.203 | 0.002 |
| Corn | do | 0.439 | 0.213 | 0.102 | 0.008 |
| Waxy maize | do | 0.670 | 0.364 | 0.561 | 0.035 |
| Tapioca | do | 0.145 | 0.000 | 0.209 | 0.002 |
| Potato | do | 0.140 | 0.059 | 0.234 | 0.181 |
| Wheat | 0.026% trypsin | 0.320 | 0.020 | 0.203 | 0.030 |
| Corn | do | 0.439 | 0.137 | 0.102 | 0.043 |
| Waxy maize | do | 0.670 | 0.370 | 0.561 | 0.068 |
| Tapioca | do | 0.145 | 0.004 | 0.209 | 0.161 |
| Potato | do | 0.140 | 0.072 | 0.234 | 0.161 |
| Wheat | 0.026% alpha-chymotrypsin | 0.320 | 0.228 | 0.203 | 0.070 |
| Corn | do | 0.439 | 0.155 | 0.102 | 0.070 |
| Waxy maize | do | 0.670 | 0.321 | 0.561 | 0.017 |
| Tapioca | do | 0.145 | 0.056 | 0.209 | 0.136 |
| Potato | do | 0.140 | 0.039 | 0.234 | 0.188 |
| Wheat | 0.006% carboxypeptidase-B | 0.320 | 0.114 | 0.203 | 0.060 |
| Corn | do | 0.439 | 0.083 | 0.102 | 0.039 |
| Waxy maize | do | 0.670 | 0.176 | 0.561 | 0.029 |
| Tapioca | do | 0.145 | 0.000 | 0.209 | 0.056 |
| Potato | do | 0.140 | 0.015 | 0.234 | 0.201 |
| Wheat | 0.026% peptidase | 0.320 | 0.286 | 0.203 | 0.114 |

TABLE 6.—TYPICAL PHYSICAL PROPERTIES OF PAPER PREPARED USING A PROTEINASE ALTERED STARCH

| | Starch | Percent starch (of pulp weight) | Burst Control | Burst Altered | Tensile Control | Tensile Altered | Tear Control | Tear Altered |
|---|---|---|---|---|---|---|---|---|
| Example: | | | | | | | | |
| 10 | Wheat | 0.25 | 18.0 | 27.6 | 8.0 | 10.8 | 77.0 | 96.9 |
| | | 0.50 | 18.9 | 28.1 | 8.9 | 13.7 | | |
| | | 1.00 | 19.4 | 31.2 | 9.0 | 13.6 | 77.6 | 110.9 |

TABLE 7.—EXONUCLEASE

| | Starch | Percent protein control | Percent protein altered | Percent lipid control | Percent lipid altered |
|---|---|---|---|---|---|
| Example: | | | | | |
| 11 | Wheat | 0.309 | 0.278 | 0.80 | 0.73 |
| 11 | Corn | 0.445 | 0.272 | 0.65 | 0.04 |
| 11 | Waxy maize | 0.264 | 0.150 | 0.07 | 0.075 |
| 11 | Tapioca | 0.139 | 0.097 | 0.130 | 0.080 |
| 11 | Potato | 0.220 | 0.000 | 0.20 | 0.06 |

TABLE 8.—LIPASE, PROTEINASE AND EXONUCLEASE
[Simultaneous treatment]

| Starch | Percent protein | Percent ash | Percent lipid |
|---|---|---|---|
| Potato starch, commercial | 0.188 | 0.250 | 0.200 |
| Potato starch, washed | 0.161 | 0.240 | 0.190 |
| Potato starch, treated | 0.007 | 0.255 | 0.140 |
| Corn starch, commercial | 0.367 | 0.370 | 0.260 |
| Corn starch, washed | 0.313 | 0.365 | 0.190 |
| Corn starch, treated | 0.091 | 0.084 | 0.130 |

[Sequential treatment]

| Starch | Percent protein | Percent ash | Percent lipid |
|---|---|---|---|
| Potato starch, commercial | 0.188 | 0.250 | 0.200 |
| Potato starch, washed | 0.179 | 0.241 | 0.150 |
| Potato starch, treated | 0.127 | 0.150 | 0.090 |
| Corn starch, commercial | 0.367 | 0.370 | 0.260 |
| Corn starch, washed | 0.303 | 0.370 | 0.140 |
| Corn starch, treated | 0.125 | 0.100 | 0.070 |

TABLE 9

| Sample | Percent lipid | Percent protein (dry basis) | Percent ash |
|---|---|---|---|
| Control, unmodified pearl corn starch | .65 | .454 | .214 |
| Example 12, starch modified as above | .015 | .054 | .055 |

EXAMPLE 16

This example illustrates the alteration of the activity of a first enzyme (wherein the typical constituent is a protein) by enzymic reaction with a second enzyme which alters an intrinsic atypical molecular fragment (a lipid) of the first enzyme. The enzyme selected is a starch hydrolase and the change in enzyme activity is measured by the changing rate of DE values over 42 hours.

200 grams of Miles diazyme (amyloglucosidase) were slurried in 2.0 l. distilled water. The slurry was heated and stabilized at 42° C. and at a pH of 6.5. Following this, 10.6 mls. of steapsin (0.004% by weight of the substrate amyloglucosidase) were added. The steapsin was prepared by dispersing 0.075 gram in 100 mls. buffered phosphate solution at 7.4 pH. A parallel control was carried out using the same components except for the lipase. After a reaction time of 7 hours, the solutions were filtered through No. 1 Whatman filter paper and the amyloglucosidase was air dried to a moisture content of less than 1.0%.

Evaluation of the diastatic activity of the treated and control samples of amyloglucosidase was carried out as follows: 100 grams of pearl corn starch (D.B.) were slurried in 300 mls. distilled water at a pH of 6.80. To this was added 0.04% (0.04 gram) Miles diastase HT-1000 for an initial conversion at 72° C. for 15 minutes (to reduce starch viscosity). The resulting converted starch was cooled to 60° C. After adjusting the pH to 5.5, 0.04 gm. (.04% based on starch weight) of the lipase-treated amyloglucosidase was added. Hydrolysis proceeded for the desired lengths of time at 55° C. A parallel control was run using slurried, washed diazyme having no lipase treatment. A second control, using the powdered diazyme as it is marketed, was also run. In Table 10 we show the dextrose equivalent (DE) obtained after hydrolysis with the commercial diazyme; the slurried, washed diazyme; and the selectively altered diazyme; respectively. It may be noted that the removal of lipid by washing effected no improvement in the DE values whereas the improvement following the steapsin treatment of the glucosidase is quite striking.

TABLE 10

| Amyloglucosidase | | Percent lipid | DE (hours) | | | | | | |
|---|---|---|---|---|---|---|---|---|---|
| | | | 3 | 12 | 18 | 24 | 30 | 36 | 42 |
| Example: 16 | Commercial (control) | 0.14 | 12 | 35 | 43 | 55 | 60 | 64 | 68 |
| | Washed (control) | 0.08 | 4 | 20 | 33 | 42 | 48 | 56 | 68 |
| | Steapsin treated | 0.02 | 4 | 23 | 42 | 59 | 68 | 76 | 83 |

EXAMPLE 17

As in Example 16, this example illustrates the alteration of the activity of an enzyme by an enzyme. The substrate enzyme chosen for this example was a commercial α-amylase, the activity of which leads to reduction in starch viscosity.

The substrate α-amylase (57 grams) was slurried in distilled water at a pH of 7.40 and a temperature of 36° C. Steapsin (0.0031% level based on the α-amylase) was added. The altered α-amylase, a "washed" α-amylase which was subjected to the above procedure except for the absence of the steapsin, and a control α-amylase in the form in which it was received were evaluated as follows: Corn starch (50 grams) was slurried at a pH of 6.50. The amylase (0.015 gram or 0.025%) was added. The mixture was heated to 72° C. on an amylograph, held 23 minutes then heated to 95° C., held for 3 minutes, and then cooled to 60° C. Results are seen in Table 11. The resulting pastes were then allowed to cool to room temperature overnight. They were then reheated to 70° C. and their viscosity was measured using a Brookfield viscometer. Results are also in Table 11.

TABLE 11

| Sample | Percent lipid | Peak 72° C. (BU) | Holding 95° C. (BU) | Reheated to 70° C. (Brookfield) |
|---|---|---|---|---|
| Treated amylase | 0.64 | 1,700 | 160 | 72,000 |
| Washed amylase | 0.68 | 840 | 60 | 5,400 |
| Untreated amylase | 0.70 | 600 | 30 | 3,000 |

EXAMPLE 18

This example is similar to Example 17 except that the substrate enzyme was a 3× crystalline commercial α-amylase (General Biochemical), the lipase was phospholipase-C, and the amylase was altered in a manner to reduce its activity.

One sterile ampule of the substrate crystalline α-amylase (48.5 mgs.) was dispersed in 150 mls. of "amylase buffer" (0.02 M $Na_2HPO_4$ adjusted to 6.90 pH and containing 0.006 M NaCl). The total was then divided into 6 aliquots, each aliquot having 8.083 mgs. crystalline enzyme per 25 ml. buffered aliquot. Phospholipase-C (12.0 mgs.) were dispersed in 100 mls. of a fresh 1.00% egg albumin at a pH of 7.00. To a 25 ml. of amylase solution was added 0.10 ml. of 0.005 M $CaCl_2$ and then 0.054 ml. of the phospholipase-C preparation (0.06% of amylase content). The reaction proceeded at 37° C. for 12 hours. A parallel control reaction was run without the phospholipase-C preparation, using only the α-amylase and the buffer. The activities of the treated and untreated α-amylase were evaluated as follows:

Potato starch (50 grams) was slurried to an 8% solids dispersion. To one sample of starch was added 0.5 ml. of the treated α-amylase solution (α-amylase to starch = 0.000427%). To a second sample of starch was added 0.5 ml. of the untreated α-amylase. Buffer alone was added to a third starch sample. The starch samples were held at 25° C. for 10 minutes, were then heated to 37° C. for 5 minutes, were then heated to 95° C. and held for 5 minutes, and were then cooled to 40° C. A Brabender Amylograph was used for these heating cycles. Results are reported in Table 12 and show that the altered α-amylase had been reduced in activity. The resulting pastes were allowed to stand overnight and then were reheated. Brookfield viscosities were determined at a number of temperatures as shown in Table 13. It will be noted that the altered amylase was not as active as the unaltered (control) amylase.

TABLE 12

| Sample | Viscosity (BU) | | | |
|---|---|---|---|---|
| | Peak | 95° C. | 70° C. | 40° C. |
| Starch | 920 | 900 | 710 | 1,100 |
| Starch plus control amylase | 340 | 180 | 180 | 300 |
| Starch plus altered amylase | 460 | 360 | 360 | 470 |

TABLE 13

| Sample | Viscosity (Cps.) | | | |
|---|---|---|---|---|
| | 30° C. | 40° C. | 60° C. | 80° C. |
| Starch | 6,800 | 5,700 | 4,600 | 4,500 |
| Starch plus control amylase | 2,500 | 2,400 | 2,300 | 2,000 |
| Starch plus altered amylase | 3,100 | 3,000 | 2,900 | 2,700 |

Examples 19–21 illustrate the activation of a latent enzyme by the method of the invention. These examples also illustrate the activation of a typical constituent (an enzyme protein) which constitutes only a minor proportion of an essentially polysaccharide molecule, a lipid being the atypical fragment.

EXAMPLE 19

Steapsin was prepared as follows:

The steapsin (4 pounds) was dispersed in 37 liters of 0.02 M $NaH_2PO_4$ and the dispersion was adjusted to a pH of 7.40. With agitation, 18.16 grams $CaCl_2$ and 9.08 grams of $Ca_2HPO_4$ were added as steapsin activators. Agitation was continued for 10 minutes. Meanwhile we had acid converted 1,000,000 pounds of corn starch to a DE of 22.0 and had then adjusted the starch liquor to a pH of 6.80 and a temperature of 55° C. The steapsin dispersion was then added to the starch liquor and the enzymic reaction was permitted to continue for 6 hours. A 10 liter aliquot was removed, the pH of the aliquot was adjusted to 5.0, and 0.0003% (based on initial dry substances) malt amylase was added (Sample No. 1). The steapsin treated tank was allowed to proceed without further enzyme additions (Sample No. 2). A control sample (Sample No. 3) was obtained by adding 0.006% maltose amylase to a sample of the original DE-22 hydrolysate (no steapsin). Results are reported in Table 14.

Table 14 shows that conversion of the steapsin treated hydrolysate continued without the addition of the amylase. It also shows that 0.003% amylase following steapsin treatment is substantially as effective as 0.006% amylase in the absence of steapsin treatment (as shown in Sample No. 3, for example). In addition to these quantitative comparisons, however, we observed a surprising change in the qualitative makeup of the final syrup. Thus the No. 1 and No. 3 samples were normal maltose syrups whereas the No. 2 sample (steapsin only) was the usual dextrose syrup obtained, for example, as a result of acid hydrolysis.

TABLE 14

|  | DE | |
|---|---|---|
|  | Steapsin treated | No. 3 0.006 malt amylase |
| Time of Reaction: | | |
| 0 | 22.0 | 22.0 |
| 2 | 28.0 | 27.9 |
| 4 | 31.5 | 31.7 |
| 6 | 32.1 | 33.6 |

|  | No. 1 0.003% malt amylase | No. 2 Steapsin only |  |
|---|---|---|---|
| 8 | | 34.5 | 36.5 |
| 12 | | 35.6 | 39.3 |
| 14 | | 36.9 | 40.2 |
| 16 | | 37.2 | 42.2 |
| 20 | 39.9 | 37.4 | (¹) |
| 22 | 41.2 | (²) | (¹) |
| 23 | (¹) | (²) | (¹) |

¹ Stopped maltose syrup.
² Stopped dextrose syrup.

EXAMPLE 20

A 10 liter slurry containing 4800 grams of corn starch was acid converted to a DE of 4.0 and was then adjusted to a pH of 6.80 and temperature of 55° C. Steapsin (0.2 gram in 20 mls. of 0.02 M $CaHPO_4$ adjusted to 7.40 pH) was added to the slurry followed by the dry addition of 0.01 gram of $CaHPO_4$ as an activator. A second sample with a DE 9.0 was similarly treated and the change in DE followed. Samples of the starch hydrolysate of DE 4.0 and 9.0, without steapsin treatment, were also followed. The results are shown in Table 15. It will be seen that the steapsin treated samples continued to hydrolyze whereas the untreated hydrolysates did not. It will be noted here, in contrast to Example 19, that hydrolysis following steapsin treatment yielded essentially a maltose product.

TABLE 15

|  | No. 1 | | No. 2 | |
|---|---|---|---|---|
|  | Altered | Control | Altered | Control |
| Reaction time: | | | | |
| 0 | 4 | 4 | 9 | 9 |
| 2 | 5.4 | | 9.2 | |
| 5 | 7.8 | | 11.3 | |
| 9 | 10.2 | | 12.7 | |
| 13 | 11.3 | | 13.3 | |
| 17 | 12.6 | | 14.4 | |
| 21 | 12.7 | 4 | 15.0 | 9 |
| Product | | No dextrose | | Slight dextrose |

EXAMPLE 21

A starch hydrolysate (4400 grams) with a DE of 6.8 was prepared by the acid conversion of corn starch. Steapsin was prepared as in Example 19 and 0.004% steapsin was added to the starch hydrolysate. Further additions of $Ca_2HPO_4$ and $CaCl_2$ were made, and the reaction carried out as previously described. No further enzyme addition was made. At the reaction times noted in Table 16, aliquots were removed, adjusted to a pH of 4.0 and a temperature of 71° F., and were filtered using 1% activated charcoal. A Brookfield viscosity and optical rotation were determined on the final aliquot. A parallel reaction (Sample No. 2) starting with a DE of 15.8 was also run. It will be noted that the two products are essentially free of dextrose. Parallel control runs on the starch hydrolysate in the absence of steapsin were run but are not reported since no change occurred. It will be observed that the treated samples, although containing little or no dextrose, exhibited a lower viscosity. This indicates that the altered hydrolysate underwent a relatively more rapid hydrolysis of high molecular weight material and substantially no hydrolysis of low molecular weight material as compared with acid hydrolysis over a comparable DE change.

TABLE 16

|  | DE | | |
|---|---|---|---|
|  | No. 1 | No. 2 | Acid converted control |
| Reaction time (hours): | | | |
| 0 | 6.8 | 15.8 | |
| 7.5 | 23.7 | 26.2 | |
| 11 | 26.6 | 28.3 | |
| 15 | 27.3 | 29.8 | |
| 20 | 28.8 | 31.3 | 30 |
| Product | (¹) | (²) | (³) |
| Optical rotation | +147.8 | +147.8 | +160 |

| °F. | No. 1 | Viscosity (cps.) | Control acid converted DE 37 syrup |
|---|---|---|---|
| 80 | 32,000 | 6,000 | 87,000 |
| 100 | 23,000 | 32,000 | 42,000 |
| 120 | 4,000 | 8,600 | 11,400 |
| 140 | 2,300 | 3,700 | 4,250 |

¹ Negligible dextrose.
² Slight dextrose.
³ Normal dextrose.

EXAMPLE 22

This example illustrates the alteration of the activity of a relatively small natural product molecule; that is, sucrose derived from sugar cane. Commercial sucrose is substantially pure but contains about 0.5 percent protein, most of which is intrinsically bound to the sucrose molecule. Sucrose (2100 grams) was made into a very viscous slurry in 500 mls. of water. The pH was adjusted to 3.3 and the temperature to 52° C. Pepsin (0.54 gram) at a level of 0.026% of the sucrose was added to the slurry and the reaction was permitted to proceed for 2 hours before being stopped. A parallel control reaction was run except that the pepsin was omitted. The result was a polymerization of altered sucrose molecules. This was evidenced by a change in optical rotation of the treated sucrose from +66.5 (control value) to +110. Further, upon boiling the untreated and treated syrups, the control remained colorless while the altered syrup turned brown.

It is apparent to us from the foregoing discussion and examples that carbohydrate molecules, particularly the starch molecule and the various polysaccharide molecules derived from starch by hydrolysis are structured in a manner such that their use as substrates illustrates the wide potential of our inventive concept. Thus the molecules of commercial starch contain, at the least, three significant atypical intrinsic molecular fragments—protein (including enzymes), lipid, and nucleic acid-containing materials—which are subject to selective degradation by selected enzymic acceleration. We have shown also that many of these atypical fragments stay with the starch molecule even following extensive hydrolysis which, in itself, is persuasive evidence of the intrinsic molecular nature of these atypical fragments. Further, we have shown that the starch hydrolysates can be activated in much the same manner as the starch itself, including, we believe, the activation of molecularly intrinsic latent hydrolase. This latter fact illustrates the activation of two members of a reacting system. Thus we can not only activate a starch or starch hydrolysate in a manner to make it more susceptible to enzyme hydrolysis, but we can also activate the hydrolase which is used to catalyze the hydrolysis.

One may wish to alter the activity of molecules of natural products other than those named in the foregoing specific examples. Cellulose, for example, can be substantially purified from physically associated impurities to yield molecules containing, for example, intrinsic protein fragments which apparently are residues of chloroplasts, and, it is our belief that such fragments are subject to alteration with selected proteinases and transferring enzymes ("ATPases"). We believe that; in those cases where glycogen, mucopolysaccharides, dextran, and gums are to be activated for use in a reaction of interest to a worker in the art; these materials will generally respond to the method of the invention in a manner similar to starch and that chitin will respond in a manner similar to cellulose. The hormones such as insulin and thyroxine comprise proteins as their typical constituent and therefore, we believe, will generally respond to atypical enzyme treatment in a manner similar to the response of enzymes when the latter are themselves treated with an atypical enzyme (for example, a lipase). Lipids such as peanut oil can contain a small proportion of intrinsic protein (for example $10^{-6}$ gram protein per mole). The latter atypical constituent, and an alteration thereof, appears to have a significant effect on lipid oxidation.

It will be apparent that not all molecules of natural products include an extensive spectrum of atypical degradable constituents such as appears to be the case with starch. One may encounter molecules of natural products which contain but one or even no such degradable constituent. Similarly, one may encounter molecules of natural products which have been subjected to purification methods (e.g. involving pyrolysis, solvent extraction, and the like) which completely remove such constituents and destroy the active sites. Since our invention depends on the initial presence of spontaneously degradable atypical intrinsic molecular constituents and the apparently unique molecular configuration which they manifest, it will be apparent to those skilled in the art that the selective method of this invention cannot be used if such constituents are not present in the substrate natural product molecules.

It is to be understood that the above described embodiments of our invention are for the purpose of illustration only and various changes may be made therein without departing from the spirit and scope of the invention.

We claim:

1. A method of altering the activity of a substantially purified natural product selected from the group consisting of starch, starch hydrolysate and sugars, wherein molecules of the natural product have, as chemically bound constituents thereof, atypical molecular fragments selected from the group consisting of protein, lipid and nucleic acid, said method comprising bringing said natural product in water into contact with at least one enzyme having activity toward said fragments and selected from the group consisting of lipase, proteinase and phosphodiesterase in an amount and under conditions effective to react with such atypical molecular fragments and alter the activity of said product.

2. The method of claim 1 wherein the natural product is a starch hydrolysate.

3. The method of claim 1 wherein the atypical molecular fragment is protein and said selected enzyme is a proteinase.

4. The method of claim 1 wherein the atypical molecular fragment is lipid and the selected enzyme is a lipase.

5. The method of claim 1 wherein the natural product is sucrose.

6. The method of claim 3 wherein the enzyme is a plant proteinase selected from the group consisting of bromelain, ficin, papain and mixtures thereof.

7. The method of claim 3 wherein the enzyme is an animal proteinase selected from the group consisting of pepsin, trypsin, chymotrypsin and mixtures thereof.

8. The method of claim 3 wherein the natural product is starch.

9. The method of claim 4 wherein the natural product is a partial hydrolysate of starch.

10. A method of altering the activity or substantially purified starch whose molecules have, as chemically bound constituents, atypical molecular fragments selected from the group consisting of protein, lipid and nucleic acid, the method comprising bringing the starch in water into contact with at least one enzyme having activity toward said fragments and selected from the group consisting of lipase, proteinase and phosphodiesterase in an amount and under conditions effective to react with such atypical molecular fragments and alter the activity of the starch.

11. The method of claim 10 in which the atypical fragment is lipid and the enzyme is a lipase.

12. The method of claim 11 wherein the lipase is a phospholipase.

13. The method of claim 11 wherein the lipase is steapsin.

14. A method of altering the activity of starch hydrolase enzyme whose molecules have, as chemically bound constituents thereof, atypical molecular lipid fragments, said method comprising bringing said enzyme in water into contact with a lipase, in an amount and under conditions effective to react with such atypical molecular fragments and alter the activity of said natural product enzymes.

15. The method of claim 14 wherein the starch hydrolase is selected from the group consisting of amyloglucosidase and α-amylase.

16. The method of claim 14 wherein the enzyme is a latent enzyme intrinsically associated with starch molecules.

17. The method of claim 14 wherein the enzyme is a latent enzyme intrinsically associated with a starch hydrolysate.

18. A method for altering the activity of a carbohydrate selected from the group consisting of starch, starch hydrolysate and sugars, wherein molecules of the carbohydrate have, as chemically bound constituents thereof, atypical molecular fragments selected from the group consisting of protein, lipid and nucleic acid, said method comprising contacting said carbohydrate in water with at least two enzymes simultaneously, each of the enzymes having activity toward said fragments and selected from the group consisting of lipase, proteinase and phosphodiesterase in an amount and under conditions effective to react with such atypical molecular fragments and alter the activity of said carbohydrate.

19. The method of claim 18 wherein the carbohydrate is starch.

20. A method for altering the activity of a carbohydrate selected from the group consisting of starch, starch hydrolysate and sugars, wherein molecules of the carbohydrate have, as chemically bound constituents thereof, atypical molecular fragments selected from the group consisting of protein, lipid and nucleic acid, said method comprising contacting said carbohydrate in water with two enzymes in sequence that have activity toward said fragments and are selected from the group consisting of lipase, proteinase and phosphodiesterase, each reaction being conducted with an amount of enzyme and under conditions effective to react with atypical molecular fragments and alter the activity of said carbohydrate.

21. The method of claim 20 wherein the carbohydrate is starch.

22. In the method of hydrolysing starch to dextrose, said starch having molecules with latent starch hydrolase chemically bound therewith, the improvement comprising contacting said starch in water with an enzyme selected from the group consisting of proteinase, lipase, and phosphodiesterase in an amount and under conditions effective to alter the activity of said latent hydrolase to hydrolyse starch.

23. The method of claim 22 wherein the enzyme is lipase.

24. A method for producing dextrose from starch comprising
(1) dispersing starch in water; said starch having lipid fragments chemically bound thereto;
(2) treating said starch in water with an enzyme exhibiting lipase activity in an amount, for a time and under conditions effective to alter the reactivity of the starch; and (3) subjecting said altered starch in water to dextrose-producing conditions of hydrolysis.

25. The method of claim 24 wherein the dispersion of starch is a parital hydrolysate of starch and wherein the altered starch hydrolysate is subjected to further hydrolysis with an enzyme exhibiting dextrogenic activity.

26. A method for hydrolysing starch having lipid fragments chemically bound thereto to dextrose which comprises the steps of
    (1) partially hydrolysing said starch in water to form a starch hydrolysate of polysaccharides having lipid fragments chemically bound thereto which are susceptible to further hydrolysis;
    (2) reacting the resulting starch hydrolysate and an effective proportion of steapsin to alter said lipid fragments; and
    (3) treating the resulting product with a dextrogenic enzyme to produce dextrose.

27. The method according to claim 26 wherein the step of partially hydrolysing starch is accomplished by acid hydrolysis.

28. The method according to claim 26 wherein the step of partially hydrolysing starch is accomplished with an enzyme.

29. The method according to claim 26 wherein the dextrogenic enzyme is amyloglucosidase.

30. A method of altering the activity of substantially purified natural product selected from the group consisting of starch, starch hydrolysate, sugars and starch hydrolase, wherein molecules of the natural product have lipid fragments as chemically bound constituents thereof, said method comprising bringing said natural product in water into contact with lipase in an amount and under conditions effective to react with such lipid fragments and alter the activity of said product.

31. The starch produced by the method of claim 10.

References Cited

UNITED STATES PATENTS

| | | | |
|---|---|---|---|
| 1,582,537 | 4/1926 | Prucha et al. | 195—2 |
| 2,503,241 | 4/1950 | Christensen | 195—31 |
| 2,587,650 | 3/1952 | Rist et al. | 127—71 |
| 2,979,438 | 4/1961 | Highberger | 195—4 |
| 3,017,330 | 1/1962 | Kerr | 195—66 |
| 3,102,054 | 8/1963 | Harris | 127—71 X |
| 3,117,063 | 1/1964 | Hurst et al. | 195—66 X |
| 3,177,200 | 4/1965 | Meyer | 195—2 X |
| 3,201,395 | 8/1965 | Wettstein et al. | |
| 3,212,996 | 10/1965 | Simmons | 195—2 X |
| 3,249,512 | 5/1966 | Bode | 195—31 |
| 3,268,417 | 8/1966 | Garbutt et al. | 195—31 |

ALVIN E. TANENHOLTZ, Primary Examiner

U.S. Cl. X.R.

195—2, 3, 4, 8, 11, 28, 31, 51, 62, 66; 127—30, 32, 71; 162—100; 260—112, 209, 211, 233.3, 397, 398

UNITED STATES PATENT OFFICE
CERTIFICATE OF CORRECTION

Patent No. 3,488,256 January 6, 1970

Robert L. High et al.

It is certified that error appears in the above identified patent and that said Letters Patent are hereby corrected as shown below:

Column 3, line 57, "in influenced" should read -- is influenced --. Column 4, line 39, "anucleic" should read -- a nucleic --; line 40, "a atypical" should read -- is atypical --. Column 9, line 15, "pepitide" should read -- peptide --. Column 10, line 5, "may be an" should read -- may be by an --. Column 11, line 58, "promixal" should read -- proximal --. Column 12, line 2, "known" should read -- know --. Column 14, line 12, "mixeure" should read -- mixture --. Column 16, line 29, "attac" should read -- attack --; line 35, "of transfer" should read -- to transfer --. Column 17, line 12, "proceduers" should read -- procedures --; line 25, "protetin" should read -- protein --. Column 18, line 22, "starct" should read -- starch --; line 31, "0.0051%" should read -- 0.0015% --. Column 21, line 23, "NAH$_2$PO$_4$" should read -- NaH$_2$PO$_4$ --;

line 31, "venum" should read -- venom --. Column 26, line 62, "DE-22" should read -- DE=22 --. Column 28, line 17, "6,000" should read -- 61,000 --.

Signed and sealed this 7th day of July 1970.

(SEAL)
Attest:

EDWARD M. FLETCHER, JR.
Attesting Officer

WILLIAM E. SCHUYLER, JR.
Commissioner of Patents